United States Patent
Kim et al.

(10) Patent No.: US 9,571,851 B2
(45) Date of Patent: Feb. 14, 2017

(54) INTER PREDICTION METHOD AND APPARATUS USING ADJACENT PIXELS, AND IMAGE ENCODING/DECODING METHOD AND APPARATUS USING SAME

(75) Inventors: Sunyeon Kim, Seoul (KR); Jeongyeon Lim, Gyeonggi-do (KR); Yunglyul Lee, Seoul (KR); Joohee Moon, Seoul (KR); Haekwang Kim, Seoul (KR); Byeungwoo Jeon, Gyeonggi-do (KR); Jongki Han, Seoul (KR); Jeonghoon Seo, Seoul (KR); Daeyeon Kim, Seoul (KR); Sungwook Hong, Seoul (KR); Jaehoon Choi, Gyeonggi-do (KR); Gyumin Lee, Gyeonggi-do (KR)

(73) Assignee: SK TELECOM CO., LTD., Seoul (KR)

( * ) Notice: Subject to any disclaimer, the term of this patent is extended or adjusted under 35 U.S.C. 154(b) by 1361 days.

(21) Appl. No.: 13/497,928

(22) PCT Filed: Sep. 24, 2010

(86) PCT No.: PCT/KR2010/006518
§ 371 (c)(1),
(2), (4) Date: May 21, 2012

(87) PCT Pub. No.: WO2011/037420
PCT Pub. Date: Mar. 31, 2011

(65) Prior Publication Data
US 2013/0022118 A1 Jan. 24, 2013

(30) Foreign Application Priority Data

Sep. 25, 2009 (KR) .................. 10-2009-0091047
Oct. 20, 2009 (KR) .................. 10-2009-0099501

(51) Int. Cl.
*H04N 7/12* (2006.01)
*H04N 11/02* (2006.01)
(Continued)

(52) U.S. Cl.
CPC ............ *H04N 19/51* (2014.11); *H04N 19/105* (2014.11); *H04N 19/147* (2014.11); *H04N 19/176* (2014.11)

(58) Field of Classification Search
CPC ........................... H04N 7/50; H04N 7/26244
See application file for complete search history.

(56) References Cited

U.S. PATENT DOCUMENTS

2005/0105809 A1* 5/2005 Abe ................. H04N 19/00763
382/236
2008/0117977 A1* 5/2008 Lee ....................... H04N 19/56
375/240.16

FOREIGN PATENT DOCUMENTS

| KR | 10-2006-0043681 | 5/2006 |
| KR | 10-2009-0034697 | 4/2009 |
| KR | 10-2009-0090151 | 8/2009 |

OTHER PUBLICATIONS

International Search Report mailed May 31, 2011 for PCT/KR2010/006518.

* cited by examiner

*Primary Examiner* — Chikaodili E Anyikire
(74) *Attorney, Agent, or Firm* — Hauptman Ham, LLP

(57) ABSTRACT

The present disclosure relates to an inter prediction method and apparatus using adjacent pixels, and a video encoding method and apparatus using the same. The inter prediction method for a predictive encoding includes: determining a current motion vector by estimating a motion of a current block; generating a reference block indicated by the current motion vector; calculating a motion compensation coeffi-
(Continued)

cient or an average compensation coefficient by using pixels neighboring the current block and pixels neighboring reference block; generating a changed reference block reflecting the motion compensation coefficient or the average compensation coefficient in the reference block; and determining the changed reference block as a predicted block of the current block. The present disclosure reduces a difference between an actual block and a predicted block by more accurately predicting the block to be encoded, thereby improving the compression efficiency.

19 Claims, 20 Drawing Sheets

(51) Int. Cl.
    *H04N 11/04*     (2006.01)
    *H04N 19/51*     (2014.01)
    *H04N 19/105*     (2014.01)
    *H04N 19/176*     (2014.01)
    *H04N 19/147*     (2014.01)

INTER PREDICTION METHOD AND APPARATUS USING ADJACENT PIXELS, AND IMAGE ENCODING/DECODING METHOD AND APPARATUS USING SAME

CROSS REFERENCE TO RELATED APPLICATION

This application claims the priority of Korean Patent Application No. 10-2009-0091047, filed on Sep. 25, 2009, and Korean Patent Application No. 10-2009-0099501, filed on Oct. 20, 2009 in the KIPO (Korean Intellectual Property Office). Further, this application is the National Phase application of International Application No. PCT/KR2010/006518 filed Sep. 24, 2010, which designates the United States and was published in Korean.

TECHNICAL FIELD

The present disclosure relates to an inter prediction method and apparatus using adjacent pixels, and a video encoding method and apparatus using the same. More particularly, the present disclosure relates to a method and an apparatus for improving the prediction accuracy by minimizing a difference between a current block and a predicted block and thus improving the compression efficiency in an inter predictive encoding of an image.

BACKGROUND

The statements in this section merely provide background information related to the present disclosure and may not constitute the prior art.

MPEG (Moving Picture Experts Group) and VCEG (Video Coding Experts Group) developed an improved and excellent video compression technology over the MPEG-4 Part 2 and H.263 standards. The new standard is called H.264/AVC (Advanced Video Coding) and was released simultaneously as MPEG-4 Part 10 AVC and ITU-T Recommendation H.264.

The H.264/AVC (hereinafter, referred to as "H.264") standard generates a residual signal by performing an intra prediction and/or an inter prediction in the unit of macroblocks having various types of subblocks, transforms and quantizes the generated residual signal, and encodes the residual signal. The inter prediction, which is one of the methods of compressing a video by removing the temporal redundancy between frames of the video, estimates motion of a block to be encoded (hereinafter, referred to as "a current block") in the unit of blocks by using one or more reference frames, generates a predicted block of a current block based on a result of estimated motion, and compensates the motion.

In a typical inter predictive encoding, when a motion of a current block is estimated for generating a predicted block, the typical inter predictive encoding searches for a block which is most similar to the current block within a determined search range of a reference frame by using a predetermined evaluation function. When the block similar to the current block is found, the typical inter predictive encoding generates the predicted block by using a corresponding block and encodes and transmits only a residual signal, which is a difference of pixel signals of the current block and the predicted block, thereby improving the compression ratio of data.

However, in the event where the motion is compensated according to the aforementioned typical inter predictive encoding, if a local illumination change or a viewpoint change occurs in each frame, it is difficult to perform efficient encoding. That is, when a pixel value is increased due to the occurrence of the illumination change or the viewpoint change at the position of a current block, compensating the motion with a predicted block generated by the existing method causes a size increase of the residual signal, resulting in deteriorated efficiency of encoding.

DISCLOSURE

Technical Problem

Therefore, the present disclosure has been made in view of the above mentioned problems to provide a method and an apparatus for improving the compression efficiency by reducing a difference between a block to be encoded and a predicted block in an inter predictive encoding of an image.

SUMMARY

An embodiment of the present disclosure provides a video encoding apparatus including: a predictor for generating a changed reference block reflecting a motion compensation coefficient calculated by using pixels neighboring a current block and pixels neighboring a reference block in a reference block indicated by a current motion vector, as a predicted block of a current block; an adder for generating a residual block by subtracting the predicted block from the current block; and an encoder for generating encoded data by encoding the residual block.

Another embodiment of the present disclosure provides a video encoding apparatus including: a predictor for generating a changed reference block reflecting an average compensation coefficient calculated by using pixels neighboring a current block and pixels neighboring a reference block selected based on motion information of the current block and motion information of neighboring blocks of the current block in the reference block indicated by the motion information of the current block, as a predicted block of the current block; an adder for generating a residual block by subtracting the predicted block from the current block; and an encoder for generating encoded data by encoding the residual block.

Yet another embodiment of the present disclosure provides a video decoding apparatus including: a decoder for reconstructing a current motion vector and a residual block by decoding encoded data; a predictor for generating a changed reference block reflecting a motion compensation coefficient calculated by using pixels neighboring a current block and pixels neighboring a reference block in the reference block indicated by a reconstructed current motion vector, as a predicted block of the current block; and an adder for reconstructing the current block by adding a reconstructed residual block to the predicted block.

Yet another embodiment of the present disclosure provides a video decoding apparatus including: a decoder for reconstructing motion information of a current block and a residual block by decoding encoded data; a predictor for generating a changed reference block reflecting an average compensation coefficient calculated by using pixels neighboring a current block and pixels neighboring a reference block selected based on reconstructed motion information of the current block and motion information of neighboring blocks of the current block in the reference block indicated by the reconstructed motion information of the current block, as a predicted block of the current block; and an adder for reconstructing the current block by adding a reconstructed residual block to the predicted block.

Yet another embodiment of the present disclosure provides an inter prediction apparatus for a predictive encoding, including: a motion estimator for determining a current motion vector by estimating a motion of a current block; a motion compensation coefficient calculator for calculating a motion compensation coefficient by using pixels neighboring a reference block indicated by the current motion vector and pixels neighboring the current block; and a motion compensator for generating a changed reference block by reflecting the motion compensation coefficient in the reference block, and determining the changed reference block as a predicted block.

Yet another embodiment of the present disclosure provides an inter prediction apparatus for a predictive encoding, including: a motion estimator for determining motion information of a current block by estimating a motion of the current block; an average compensation coefficient calculator for generating a reference block indicated by the motion information of the current block, and calculating an average compensation coefficient by using pixels neighboring the current block and pixels neighboring the reference block selected based on the motion information of the current block and motion information of neighboring blocks of the current block; and a motion compensator for generating a changed reference block reflecting the average compensation coefficient in the reference block, and determining the changed reference block as a predicted block of the current block.

Yet another embodiment of the present disclosure provides an inter prediction apparatus for a predictive decoding, including: a motion compensation coefficient calculator for generating a reference block indicated by a current motion vector reconstructed by decoding encoded data, and calculating a motion compensation coefficient by using pixels neighboring a current block and pixels neighboring the reference block; and a motion compensator for generating a changed reference block reflecting the motion compensation coefficient in the reference block, and determining the changed reference block as a predicted block of the current block.

Yet another embodiment of the present disclosure provides an inter prediction apparatus for a predictive decoding, including: an average compensation coefficient calculator for generating a reference block indicated by motion information of a current block reconstructed by decoding encoded data, and calculating an average compensation coefficient by using pixels neighboring the current block and pixels neighboring the reference block selected based on the motion information of a reconstructed current block and motion information of neighboring blocks of the current block; and a motion compensator for generating a changed reference block reflecting the average compensation coefficient in the reference block, and determining the changed reference block as a predicted block of the current block.

Yet another embodiment of the present disclosure provides a video encoding method, including: generating a changed reference block reflecting a motion compensation coefficient calculated by using pixels neighboring a current block and pixels neighboring a reference block in a reference block indicated by a current motion vector, as a predicted block of the current block; generating a residual block by subtracting the predicted block from the current block; and generating encoded data by encoding the residual block.

Yet another embodiment of the present disclosure provides a video encoding method including: generating a changed reference block reflecting an average compensation coefficient calculated by using pixels neighboring a current block and pixels neighboring a reference block selected based on motion information of the current block and motion information of neighboring blocks of the current block in the reference block indicated by the motion information of the current block, as a predicted block of the current block; generating a residual block by subtracting the predicted block from the current block; and generating encoded data by encoding the residual block.

Yet another embodiment of the present disclosure provides a video decoding method, including: reconstructing a current motion vector and a residual block by decoding encoded data; generating a changed reference block reflecting a motion compensation coefficient calculated by using pixels neighboring a current block and pixels neighboring a reference block in the reference block indicated by a reconstructed current motion vector, as a predicted block of the current block; and reconstructing the current block by adding a reconstructed residual block to the predicted block.

Yet another embodiment of the present disclosure provides a video decoding method, including: reconstructing motion information of a current block and a residual block by decoding encoded data; generating a changed reference block reflecting an average compensation coefficient calculated by using pixels neighboring the current block and pixels neighboring a reference block selected based on reconstructed motion information of the current block and motion information of neighboring blocks of the current block in the reference block indicated by the reconstructed motion information of the current block, as a predicted block of the current block; and reconstructing the current block by adding a reconstructed residual block to the predicted block.

Yet another embodiment of the present disclosure provides an inter prediction method for a predictive encoding, including: determining a current motion vector by estimating a motion of a current block; generating a reference block indicated by the current motion vector; calculating a motion compensation coefficient by using pixels neighboring the current block and pixels neighboring the reference block; generating a changed reference block reflecting the motion compensation coefficient in the reference block; and determining the changed reference block as a predicted block of the current block.

Yet another embodiment of the present disclosure provides an inter prediction method for a predictive encoding, including: determining motion information of a current block by estimating a motion of the current block; generating a reference block indicated by the motion information of the current block; calculating an average compensation coefficient by using pixels neighboring the current block and pixels neighboring the reference block selected based on the motion information of the current block and motion information of neighboring blocks of the current block; generating a changed reference block reflecting the average compensation coefficient in the reference block; and determining the changed reference block as a predicted block of the current block.

Yet another embodiment of the present disclosure provides an inter prediction method for a predictive decoding, including: generating a reference block indicated by a current motion vector reconstructed by decoding encoded data; calculating a motion compensation coefficient by using pixels neighboring a current block and pixels neighboring a reference block; generating a changed reference block by reflecting the motion compensation coefficient in the reference block; and determining the changed reference block as a predicted block of the current block.

Yet another embodiment of the present disclosure provides an inter prediction method for a predictive decoding, including: generating a reference block indicated by motion information of a current block reconstructed by decoding encoded data; calculating an average compensation coefficient by using pixels neighboring the current block and pixels neighboring the reference block selected based on the motion information of a reconstructed current block and motion information of neighboring blocks of the current block; generating a changed reference block reflecting the average compensation coefficient in the reference block; and determining the changed reference block as a predicted block of the current block.

Advantageous Effects

According to the present disclosure as described above, a difference between an actual block and a predicted block can be reduced by more accurately predicting the block to be encoded, and thus the compression efficiency is improved.

DETAILED DESCRIPTION

Figure 1:
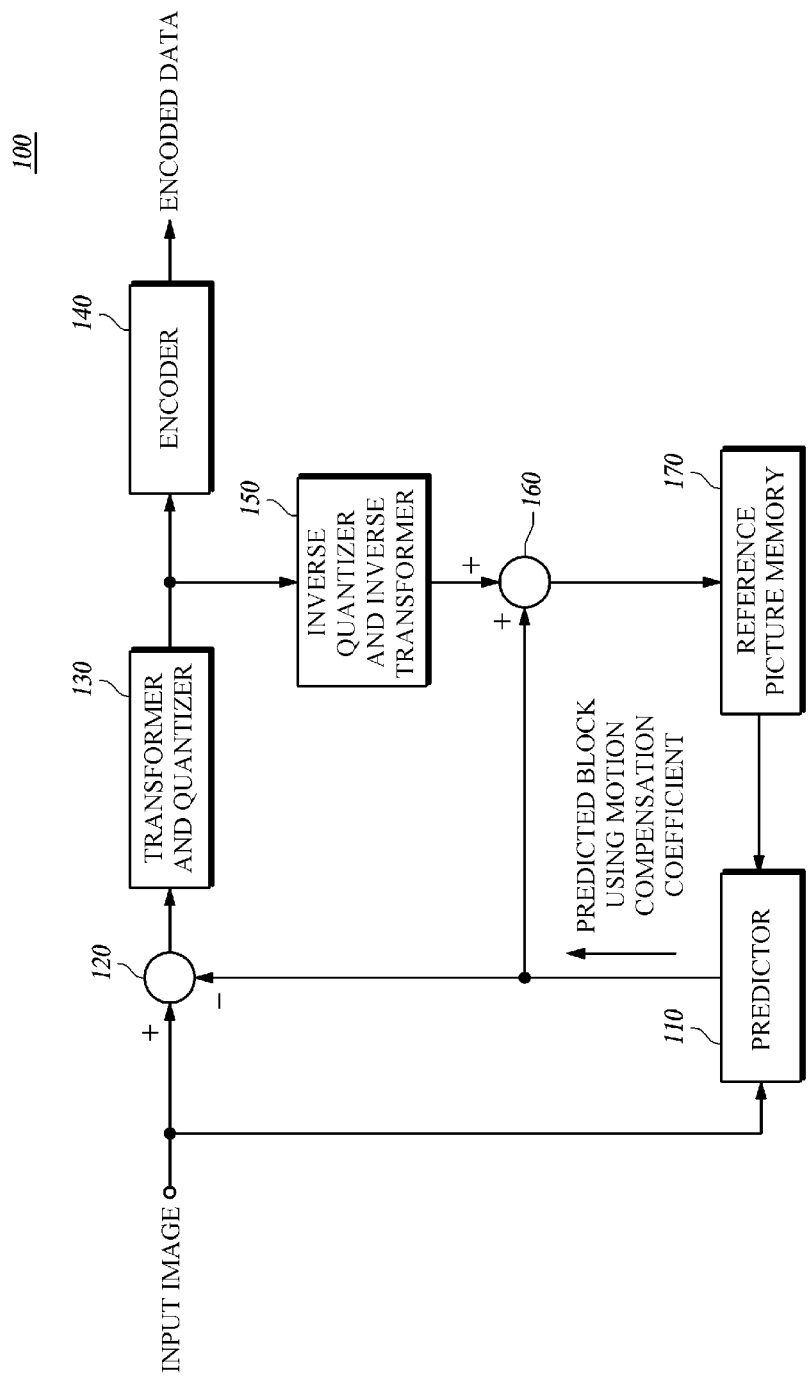
FIG. 1 is a block diagram schematically illustrating a video encoding apparatus according to a first embodiment of the present disclosure.

Hereinafter, embodiments of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

A video encoding apparatus or video decoding apparatus described hereinafter may be a personal computer or PC, notebook or laptop computer, personal digital assistant or PDA, portable multimedia player or PMP, PlayStation Portable or PSP, or mobile communication terminal, smart phone or such devices, and represent a variety of apparatuses equipped with, for example, a communication device such as a modem for carrying out communication between various devices or wired/wireless communication networks, a memory for storing various programs for performing an inter prediction or encoding or decoding a video by using the inter prediction and related data, and a microprocessor for executing the programs to effect operations and controls.

In addition, a video encoded into a bitstream by the video encoding apparatus may be transmitted in real time or non-real-time to the video decoding apparatus for decoding the same where it is reconstructed into the image and reproduced into the video after being transmitted via a wired/wireless communication network including the Internet, a short range wireless communication network, a wireless LAN network, a WiBro (Wireless Broadband) also known as WiMax network, and a mobile communication network or a communication interface such as cable or USB (universal serial bus).

In addition, although the video encoding apparatus and the video decoding apparatus may be equipped with the functions of performing the inter prediction as well as the intra prediction using motion estimation and motion compensation, which lacks a direct correlation with the embodiments of the present disclosure, a detailed description will be provided to avoid any confusions.

A video typically includes a series of pictures each of which is divided into blocks. Each of the blocks is generally classified into an intra block or an inter block depending on an encoding method. The intra block means a block encoded using an intra predictive encoding, and the intra predictive encoding is a method of generating a predicted block by predicting pixels of a current block by using pixels of blocks which have reconstructed through previous encoding and decoding within a current picture to be currently encoded and then encoding a differential value of pixels between the predicted block and the current block. The inter block means a block encoded through an inter predictive encoding which generates the predicted block by predicting the current block in the current picture through referencing one or more past pictures or future pictures and then encoding the differential value of the predicted block from the current block. Here, the picture that is referenced in encoding or decoding the current picture is called a reference picture.

In the meantime, a conventional inter predictive encoding generates a predicted block having the same size as that of a current block, subtracts a pixel value of the predicted block from a pixel value of the current block at the same position, and generates a residual block. For example, when the residual block is generated by subtracting the predicted block from the current block having the same size of 16×16, the residual block may be expressed as Formula 1 below.

$$residual_{ij} = original_{ij} - reference_{ij}$$ Formula 1

In Formula 1, original represents the current block, reference represents the predicted block generated through motion compensation, residual represents the residual block generated through subtraction of the predicted block from the current block, and i and j represent a pixel position of each block, respectively.

Since the H.264 uses an inter predictive encoding, it may improve the compression efficiency compared to other predictive encoding using no inter predictive encoding. However, because the conventional inter predictive encoding including the H.264 generates the residual block by using only the pixels of the current block and the predicted block, when a viewpoint change or an illumination change occurs in a reference picture used for generating the predicted block and a current picture, it is impossible to perform efficient predictive encoding. For example, in the event where a region including the current block becomes locally bright or dark, if the residual block is generated by performing the motion compensation and the inter prediction according to the existing method, performance of the motion compensation with reflection of a brightness change fails to occur, so that a value of the residual block is relatively increased, thereby failing to achieve efficient predictive encoding.

In first and second embodiments of the present disclosure, the inter predictive encoding is performed by performing the motion compensation, in which a characteristic of the block is reflected, by using adjacent pixels of the current block and adjacent pixels of the predicted block, differently from the existing inter predictive encoding of performing the motion compensation by using only the current block and the predicted block. In this case, the characteristic of the block may be a local illumination change or a viewpoint change, and the accuracy of the prediction is increased by more accurately compensating for the motion of the current block using pixels neighboring the current block and pixels neighboring a reference block in order to have the characteristic of the block considered, thereby improving the compression efficiency.

Each picture of an input video to be encoded may be input in the unit of macroblocks. In the first and second embodiments of the present disclosure, a macroblock has a size of M×N, and M and N may have a size of $2^n$, and may be the same. Accordingly, the macroblock according to the first and second embodiments of the present disclosure may be the same as or larger than a macroblock of the H.264.

FIG. 1 is a block diagram schematically illustrating a video encoding apparatus according to a first embodiment of the present disclosure.

The video encoding apparatus 100 according to the first embodiment of the present disclosure, which is an apparatus for encoding a video, includes a predictor 110, a subtracter 130, a transformer and quantizer 130, an encoder 140, an inverse quantizer and inverse transformer 150, an adder 160, and a reference picture memory 170.

The predictor 110 performs inter prediction on a block to be encoded (e.g. a macroblock, a subblock, etc., hereinafter, referred to as "a current block"), to generate a predicted block. Specifically, the predictor 110 generates a motion vector by estimating motion of a current block in a previous picture, which has been reconstructed through previous encoding and decoding again, according to an inter prediction mode, and generates a predicted block by compensating the motion of the current block by using the motion vector.

Further, when the predictor 110 generates the predicted block by compensating the motion of the current block, it uses adjacent pixels of the current block (or called "pixels neighboring the current block") and adjacent pixels of the reference block (or called "pixels neighboring the reference block"). That is, the predictor 110 may generate a changed reference block by reflecting a motion compensation coefficient calculated by using the pixels neighboring the current block and the pixels neighboring the reference block in the reference block directed by the motion vector of the current block, which is determined through the motion estimation of the current block, and generate the changed reference block as the predicted block of the current block.

To this end, the predictor 110 may determine a more efficient block between the reference block and the changed reference block as the predicted block of the current block. Specifically, the predictor 110 may determine a block to be used as the predicted block of the current block between the reference block and the changed reference block by using a method including a rate-distortion optimization or analyzing the characteristic of the adjacent pixels, in order to determine the use of the motion compensation coefficient. The predictor 110 may be described with reference to FIG. 2 in detail.

The subtracter 120 subtracts the predicted block from the current block to generate a residual block. Specifically, the subtracter 130 subtracts a pixel value of the predicted block generated in the predictor 110 and a pixel value of the current block to generate a residual block having a residual signal.

The transformer and quantizer 130 transforms and quantizes the residual block generated in the subtracter 120 into a frequency domain. Specifically, the transformer and quantizer 130 generates a transformed residual block having a transform coefficient by transforming the residual signal of the residual block generated by the subtracter 130 into a frequency domain, and generates a quantized residual block by quantizing the transform coefficient of the transformed residual block. Here, the method used for transforming the residual signal into the frequency domain may be the discrete cosine transform (DCT) based transform or Hadamard transform among various other unlimited transforming techniques, whereby an image signal in a spatial region is transformed into the frequency domain, and the quantizing method used may be the dead zone uniform threshold quantization (DZUTQ) or the quantization weighted matrix among their various improvement options.

The encoder 140 encodes a quantized transform coefficient of the residual block transformed and quantized by the transformer and quantizer 130, to generate encoded data. The encoding method may employ the entropy encoding technique, but it is not necessarily limited thereto, and may use other various encoding techniques.

Further, the encoder 140 may insert various information necessary for decoding an encoded bitstream, as well as an encoded bitstream of the quantized transform coefficients, in the encoded data. That is, the encoded data may include a first field containing a Coded Block Pattern (CBP), a delta quantization parameter, and an encoded bitstream of the quantized transform coefficient and a second field containing a bit for information necessary for the prediction (e.g. an intra prediction mode in a case of the intra prediction, and the motion vector in a case of the inter prediction).

In this event, the encoder 140 may insert motion compensation coefficient usage information indicating the use of the motion compensation coefficient in the encoded data. However, the motion compensation coefficient usage information is not necessarily included in the encoded data, and may be or may not be included in the encoded data depending on a condition used for the determination of the changed reference block, in which the motion compensation coefficient is reflected, as the predicted block of the current block, which will be described with reference to FIG. 2 in detail.

In the meantime, the function of the transformer and quantizer 130 may be combined in the encoder 140 for implementation. That is, when the function of the transformer and quantizer 130 is integrally implemented as the encoder 140, the encoder 140 encodes the residual block to generate the encoded data.

The inverse quantizer and inverse transformer 150 inversely quantizes and inversely transforms the residual block transformed and quantized by the transformer and quantizer 130, to reconstruct the residual block. Specifically, the inverse quantizer and inverse transformer 150 inversely quantizes the quantized residual block transferred from the transformer and quantizer 130 to reconstruct the residual block having the transform coefficient, and inversely transforms the residual block having the transform coefficient again to reconstruct the residual block having the residual signal.

The adder 160 adds the predicted block generated in the predictor 110 to the residual block reconstructed by the inverse quantizer and inverse transformer 150, to reconstruct the current block.

The reference picture memory 170 accumulates the current block reconstructed in the adder 160 in the unit of pictures and stores the current block as the reference picture. The stored reference picture is used in the prediction of a next block or a next picture by the predictor 110.

Although it is not illustrated in FIG. 1, the video encoding apparatus 100 according to the first embodiment of the present disclosure may further include an intra predictor for the intra prediction, a deblocking filter for the deblocking-filtering of the reconstructed current block, etc. Further, the transformer and quantizer 130 and the inverse quantizer and inverse transformer 150 may additionally perform a transform and quantization (or an inverse transform and inverse quantization) calculation on a specific picture (e.g. an intra picture). Here, the deblocking-filtering means an operation of reducing block distortion generated during the encoding of the image in the unit of blocks, and may selectively use one of a method of applying a deblocking filter to a block boundary and a macroblock boundary, a method of applying a deblocking filter only to a macroblock boundary, and a method of using no deblocking filter.

Figure 2:
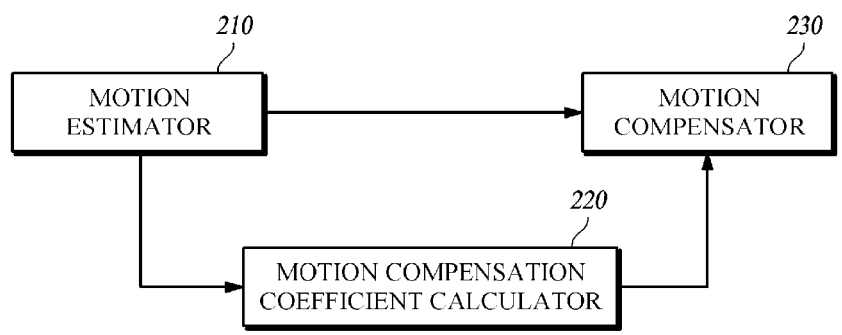
FIG. 2 is a block diagram schematically illustrating an inter prediction apparatus for a predictive encoding according to a first embodiment of the present disclosure.

FIG. 2 is a block diagram schematically illustrating an inter prediction apparatus for a predictive encoding according to the first embodiment of the present disclosure.

The inter prediction apparatus for a predictive encoding according to the first embodiment of the present disclosure may be implemented as the predictor 110 in the video encoding apparatus 100 according to the embodiment of the present disclosure aforementioned with reference to FIG. 1, and is called the predictor 110 for convenience of description hereinafter.

The predictor 110 may include a motion estimator 210, a motion compensation coefficient calculator 220, and a motion compensator 230.

The motion estimator 210 estimates motion of the current block to determine a current motion vector. Specifically, the motion estimator 210 estimates the motion of the current block by searching for a position of the reference block which has the smallest difference with the current block in a picture obtained by up-sampling the picture which has been reconstructed through previous encoding and decoding. In this event, the space between the pixels may be interpolated for the up-sampling of the picture, and a filter used for the interpolation may be either a fixed 6-tap filter or an adaptive interpolation filter optimized in the unit of pictures or blocks. The vector indicating the reference block having the smallest difference with the current block is obtained as the motion vector of the current block, i.e. the current motion vector.

The motion compensation coefficient calculator 220 calculates the motion compensation coefficient by using the pixels neighboring the reference block of the reference block directed by the current motion vector and the pixels neighboring the current block. Specifically, the motion compensation coefficient calculator 220 calculates the motion compensation coefficient for the more accurate compensation of the motion of the current block by using the pixels neighboring the current block and the pixels neighboring the reference block.

Figure 3:
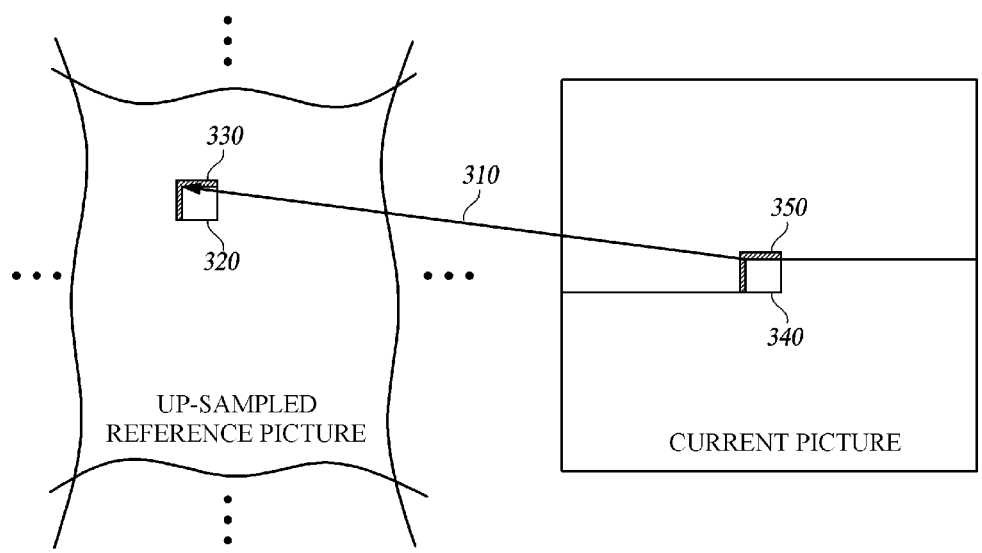
FIG. 3 is a view illustrating adjacent pixels for a calculation of a motion compensation coefficient according to the first embodiment of the present disclosure.

FIG. 3 is a view illustrating adjacent pixels for a calculation of a motion compensation coefficient according to the first embodiment of the present disclosure.

Referring to FIG. 3, the motion compensation coefficient may be calculated with a difference between an average of the pixels 350 neighboring the current block and an average of the pixels 330 neighboring the reference block. The current motion vector 310 may be obtained by searching for the reference block 320 having the smallest difference with the current block 340 within the current picture and estimating the motion of the current block 340. As illustrated in FIG. 3, the pixels 350 neighboring the current block may be pixels adjacent to the current block 340, and the pixels 330 neighboring the reference block may be pixels adjacent to the reference block 320.

Figure 4:
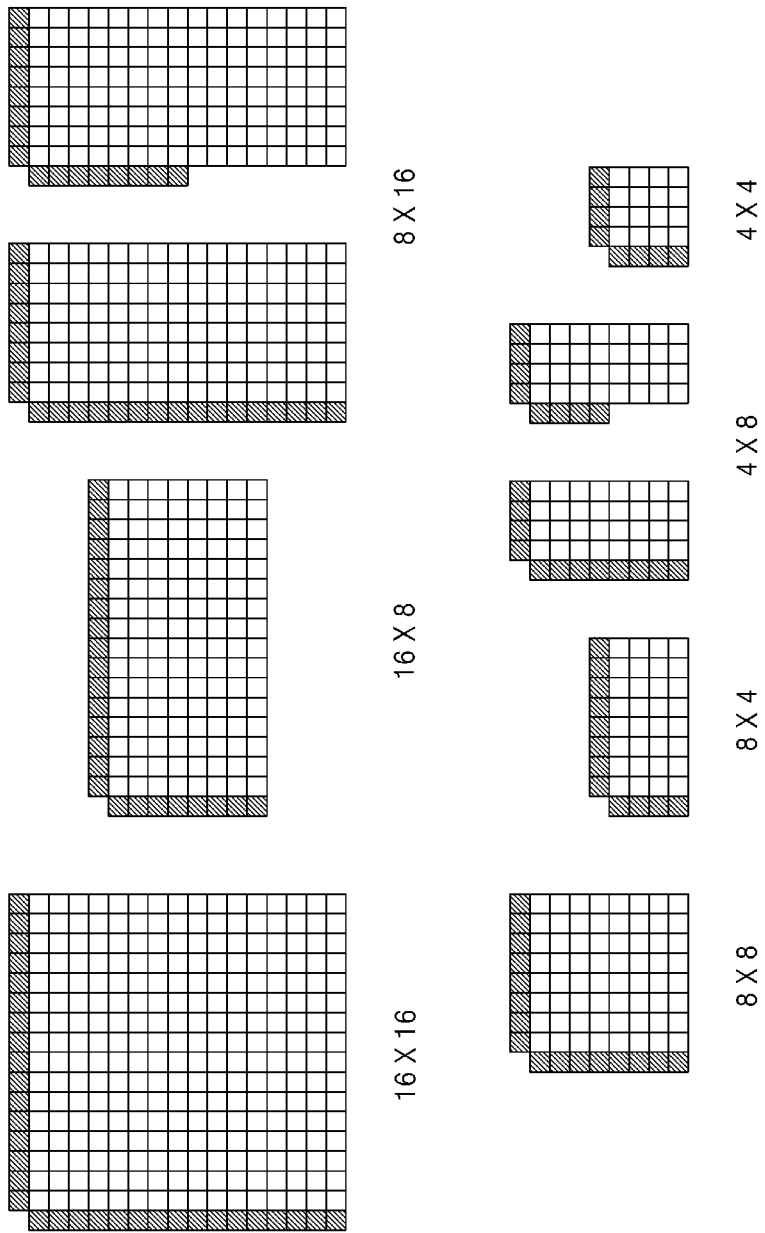
FIG. 4 is a diagram illustrating adjacent pixels for each inter prediction mode according to the first embodiment of the present disclosure.

FIG. 4 is a diagram illustrating adjacent pixels according to each inter prediction mode according to a first embodiment of the present disclosure.

FIG. 4 illustrates an example of a case in which a macroblock has a size of 16×16, but it may be applied to a macroblock having a different size in a similar manner.

As illustrated in FIG. 4, when the inter prediction mode is an inter 16×16 mode, respective sixteen adjacent pixels neighboring a top side and a left side of the reference block and the current block may be used as the pixels neighboring the reference block and the pixels neighboring the current block. When the inter prediction mode is an inter 16×8 mode, for each of the two subblocks having a size of 16×8, sixteen adjacent pixels neighboring a top side of the current block and eight adjacent pixels in a left side of each subblock may be used as the pixels neighboring the reference block and the pixels neighboring the current block. When the inter prediction mode is an inter 8×16 mode, for each of the two subblocks having a size of 8×16, sixteen adjacent pixels neighboring a left side of the current block and eight adjacent pixels in a top side of each subblock may be used as the pixels neighboring the reference block and the pixels neighboring the current block.

When the inter prediction mode is an inter 8×8 mode, for each of the subblocks having a size of 8×8, eight adjacent pixels neighboring a left side of the current block and eight adjacent pixels in a top side of the current block may be used as the pixels neighboring the reference block and the pixels neighboring the current block. When the inter prediction mode is an inter 8×4 mode, each of the two subblocks may refer to eight top side pixels and four left side pixels. When the inter prediction mode is an inter 4×8 mode, a left subblock may refer to four pixels at the top side and eight pixels at the left side, and a right subblock may refer to respective eight pixels at the top side and the left side. When the inter prediction mode is an inter 4×4 mode, each of four subblocks may refer to respective four pixels at the top side and the left side.

Here, the adjacent pixels used for generating the motion compensation coefficient may not be necessarily used as described above. For example, each of the number of adjacent pixels neighboring the top side and the number of adjacent pixels neighboring the left side may be changed to four or eight according to the adjacent pixels used depending on the transform size, such as 4×4 or 8×8, and the range of the number of adjacent pixels referred to in generating a motion compensation coefficient may be expanded beyond one pixel to two pixels including upper pixels 4×2 (8×2) and left pixels 2×4 (2×8).

The motion compensation coefficient calculated using the pixels neighboring the current block and the pixels neighboring the reference block may be calculated with a difference between an average of the pixels neighboring the current block and an average of the pixels neighboring the reference block as expressed in Formula 2. The pixels neighboring the current block and the pixels neighboring the reference block are pixels which have been reconstructed through previous encoding and decoding prior to the encoding of the current block.

$$mc_{coeff} = m_r - m_c$$ Formula 2

In Formula 2, $m_r$ represents an average of the pixels neighboring the reference block, $m_c$ represents an average of the pixels neighboring the current block, and $mc_{coeff}$ represents a motion compensation efficient.

Referring to FIG. 2 again, the motion compensator 230 generates the changed reference block by reflecting the motion compensation coefficient in the reference block and determines the changed reference block as the predicted block. Specifically, the motion compensator 230 determines one of the reference block directed by the current motion vector obtained in the motion estimator 210 and the changed reference block generated through the reflection of the motion compensation coefficient in the reference block as the predicted block of the current block.

For example, the motion compensator 230 may determine the changed reference block as the predicted block of the current block based on an encoding cost for the reference block and an encoding cost for the changed reference block. To this end, the motion compensator 230 may calculate the encoding cost for the reference block and the encoding cost for the changed reference block, and determine the changed reference block as the predicted block of the current block when the encoding cost for the reference block is larger than the encoding cost for the changed reference block, and determine the reference block as the predicted block of the current block when the encoding cost for the reference block is equal to or smaller than the encoding cost for the changed reference block.

Here, the encoding cost for the reference block refers to an encoding cost required for the predictive encoding of the current block by using the reference block as the predicted block of the current block, and the encoding cost for the changed e block refers to an encoding cost required for the predictive encoding of the current block by using the changed reference block as the predicted block of the current block. The encoding cost may use a rate-distortion cost, but it is not necessarily limited thereto, and may use any cost if the cost is required for the inter predictive encoding of the current block by using the reference block or the changed reference block as the predicted block.

For another example, the motion compensator 230 may determine the changed reference block as the predicted block of the current block based on a value of the motion compensation coefficient. To this end, the motion compensator 230 may determine the changed reference block as the predicted block of the current block when a value of the motion compensation coefficient is not "0", and determine the reference block as the predicted block of the current block when a value of the motion compensation coefficient is "0". When a value of the motion compensation coefficient is "0", a case of the encoding using the changed reference block, in which the motion compensation coefficient is reflected, as the predicted block of the current block and a case of the encoding using the reference block, in which the motion compensation coefficient is not reflected, as the predicted block of the current block have the same result, so that it is not necessary to use the motion compensation coefficient. Further, when the value of the motion compensation coefficient belongs to a predetermined range, the motion compensator 230 may determine the changed reference block as the predicted block of the current block, and when the value of the motion compensation coefficient does not belong to the predetermined range, the motion compensator 230 may determine the reference block as the predicted block of the current block. Here, the predetermined range may be a range smaller than a maximum threshold and larger than a minimum threshold, and the maximum threshold and the minimum threshold may be determined using one or more of a dispersion, a standard deviation, and a coefficient of correlation of the pixels neighboring the current block and the pixels neighboring the reference block. That is, as expressed in Formula 3, the motion compensator 230 may determine the changed reference block as the predicted block of the current block only when the value of the motion compensation coefficient belongs to the predetermined range.

$$Thd_a < mc_{coeff} < Thd_b \qquad \text{Formula 3}$$

In Formula 3, $mc_{coeff}$ represents the motion compensation coefficient, $Thd_a$ represents the minimum threshold, and $Thd_b$ represents the maximum threshold.

As described above, when the motion compensator 230 determines the changed reference block as the predicted block of the current block based on the value of the motion compensation coefficient, the motion compensator 230 may determine whether the value of the motion compensation coefficient is "0" and whether the value of the motion compensation coefficient belongs to the predetermined range, respectively, to determine the changed reference block as the predicted block of the current block according to the determination, but may also combine the two conditions, to determine the changed reference block as the predicted block of the current block. That is, only when the value of the motion compensation coefficient is not "0" and belongs to the predetermined range, the motion compensator 230 may determine the changed reference block as the predicted block of the current block, and when the value of the motion compensation coefficient is "0", or the value of the motion compensation coefficient is not "0" but does not belong to the predetermined range, the motion compensator 230 may determine the reference block as the predicted block of the current block.

For another example, the motion compensator 230 may calculate one or more of the dispersion, the standard deviation, and the coefficient of correlation of the pixels neighboring the current block and the pixels neighboring the reference block, and determine the changed reference block as the predicted block of the current block only when a calculated value meets a specific condition, or determine the reference block as the predicted block of the current block when the calculated value does not meet the specific condition.

The motion compensator 230 may generate the changed reference block by subtracting the motion compensation coefficient from each pixel of the reference block. Specifically, each pixel of the changed reference block has a difference value obtained by subtracting the motion compensation coefficient from a value of each pixel of the reference block. In this case, since the difference value obtained by subtracting the motion compensation coefficient from the value of each pixel of the reference block may not belong to a range of a value indicating pixels, the motion compensator 230 may limit the value obtained by subtracting the motion compensation coefficient from the value of each pixel of the reference block within the range of the value indicating pixels, to generate the changed reference block.

For example, each pixel of the current block, the reference block, the changed reference block, etc. has a value represented by 8 bits, an available pixel value is one within a range of 0 through 255. When any one pixel among the respective pixels of the reference block has a value of "1" and the motion compensation coefficient is calculated as "3", a corresponding pixel in the changed reference block has a value of "−2", so that it does not belong to the range of the value indicating pixels. Accordingly, in this case, the pixel value is limited so as to have one value within the range of 0 through 255 and the pixel value of the corresponding pixel of the changed reference block is changed such that the pixel value of the corresponding pixel has a value of "0" as the minimum value.

When the residual block is calculated through determination of the changed reference block generated as described above as the predicted block of the current block, the residual block may be calculated by Formula 4.

$$residual_{ij} = original_{ij} - clip(reference_{ij} - mc_{coeff}) \qquad \text{Formula 4}$$

In Formula 4, $original_{ij}$ represents each pixel of the current block, $reference_{ij}$ represents each pixel of the reference block, and $residual_{ij}$ represents each pixel of the residual block. Here, $clip(reference_{ij} - mc_{coeff})$ represents each pixel of the changed reference block, wherein a function, clip( ) limits a minimum value and a maximum value such that $reference_{ij} - mc_{coeff}$ that is each pixel of the changed reference block has a value within a range of a value indicating pixels (e.g. a value within a range from 0 to 255 when the pixel value is represented by 8 bits).

The motion compensator 230 may refine a current motion vector by additionally estimating the motion of the current block through the application of the motion compensation coefficient. Specifically, the motion compensator 230 applies the motion compensation coefficient to a predetermined range (e.g. ±α pixel) around the pixels directed by the current motion vector determined in the motion estimator 210 and additionally performs the motion estimation, so that it is possible to further increase the encoding efficiency through the performance of a more accurate prediction of the block (or the macroblock) of a region in which a local illumination or a viewpoint is changed.

For example, in a case where the current motion vector is set as (2,4) and a for determining the predetermined range is set as "1", the motion compensator 230 may perform the motion compensation on positions of (1, 3), (1, 4), (1, 5), (2, 3), (2, 4), (2, 5), (3, 3), (3, 4), and (3, 5) by using the motion compensation coefficient and calculate an optimal motion vector by comparing the encoding cost (e.g. a rate-distortion cost, a Sum of Absolute Difference (SAD), a Sum of Absolute Transformed Difference (SATD), or a Sum of Squared Difference (SSD)) of each position, so that the calculated optimal motion vector is finally determined as the current motion vector. Here, a may be appropriately set according to an implementation method or condition, and the encoding efficient may be increased as a increases.

Further, the motion compensator 230 may determine whether to determine the changed reference block as the predicted block of the current block based on the unit of frames, not the unit of blocks. To this end, the motion compensator 230 may adaptively encode each frame by calculating the encoding cost of a case in which a current frame to be encoded is encoded using the motion compensation coefficient and the encoding cost of a case in which a current frame to be encoded is encoded without using the motion compensation coefficient and encoding the current frame according to the encoding method requiring the smaller encoding cost. In this case, motion compensation coefficient usage information for identifying whether each frame is encoded with the application of the motion compensation coefficient is additionally inserted in the encoded data.

Hereinafter, an inter prediction method for a predictive encoding performed by the predictor 110 aforementioned with reference to FIG. 2 will be described.

According to the inter prediction method for the predictive encoding, the predictor 110 determines a current motion vector by estimating motion of a current block, generates a reference block directed by the current motion vector, calculates a motion compensation coefficient by using pixels neighboring the current block and pixels neighboring the reference block, generates a changed reference block by reflecting the motion compensation coefficient in the reference block, and determines the changed reference block as a predicted block of the current block.

Here, the predictor 110 may determine the changed reference block as the predicted block of the current block based on an encoding cost for the reference block and an encoding cost for the changed reference block. To this end, the predictor 110 may calculate the encoding cost for the reference block and the encoding cost for the changed reference block, and determine the changed reference block as the predicted block of the current block when the encoding cost for the reference block is larger than the encoding cost for the changed reference block and determines the reference block as the predicted block of the current block when the encoding cost for the reference block is equal to or smaller than the encoding cost for the changed reference block.

Further, the predictor 110 may determine the changed reference block as the predicted block of the current block based on a value of the motion compensation coefficient. To this end, the predictor 110 may determine the changed reference block as the predicted block of the current block when a value of the motion compensation coefficient is not "0" and determine the reference block as the predicted block of the current block when a value of the motion compensation coefficient is "0". Otherwise, the predictor 110 may determine the changed reference block as the predicted block of the current block when the value of the motion compensation coefficient belongs to a predetermined range and determine the reference block as the predicted block of the current block when the value of the motion compensation coefficient does not belong to the predetermined range. Here, the predetermined range may be a range smaller than a maximum threshold and larger than a minimum threshold, and the maximum threshold and the minimum threshold may be determined using one or more of a dispersion, a standard deviation, and a coefficient of correlation of the pixels neighboring the current block and the pixels neighboring the reference block.

Further, the predictor 110 may refine the current motion vector by additionally estimating the motion of the current block with the application of the motion compensation coefficient.

Further, the motion compensation coefficient may be a difference between an average of the pixels neighboring the current block and an average of the pixels neighboring the reference block, and the pixels neighboring the current block and the pixels neighboring the reference block may be pixels which have been reconstructed through previous encoding and decoding before the encoding of the current block.

Further, the predictor 110 may generate the changed reference block by subtracting the motion compensation coefficient from each pixel of the reference block, wherein the predictor 110 may limit the value obtained by subtracting the motion compensation coefficient from each pixel of the reference block to a range of the value indicating pixels, to generate the changed reference block.

Figure 5:
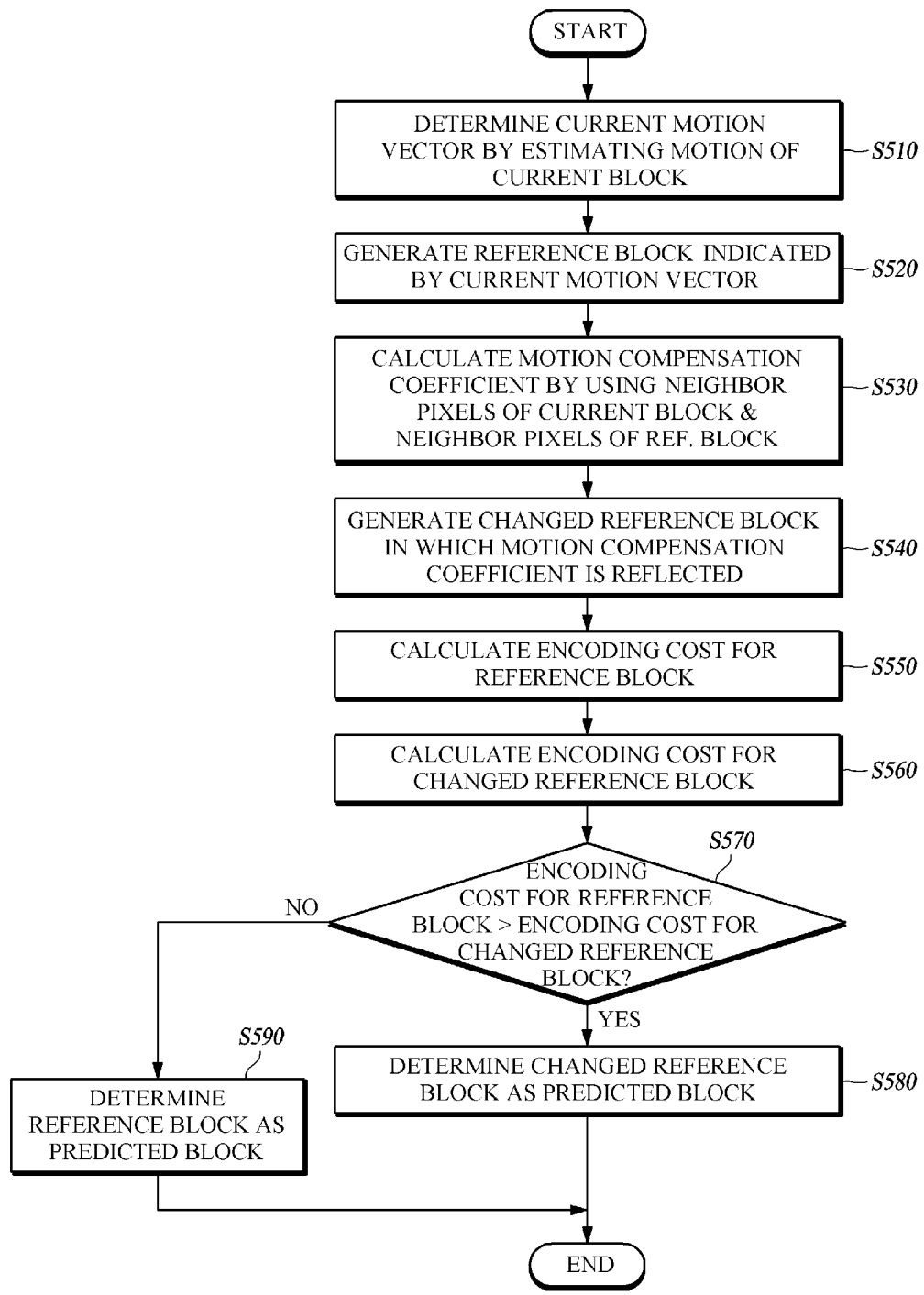
FIG. 5 is a flowchart illustrating an example of an inter prediction method for a predictive encoding according to the first embodiment of the present disclosure.

FIG. 5 is a flowchart illustrating an example of an inter prediction method for a predictive encoding according to a first embodiment of the present disclosure.

The inter prediction method for a predictive encoding according to the first embodiment of the present disclosure may be implemented as illustrated in FIG. 5. That is, the predictor 110 may determine whether to perform a motion compensation of a current block with an application of a motion compensation coefficient based on an encoding cost to generate a predicted block. Referring to FIG. 5, the predictor 110 determines a current motion vector by estimating motion of a current block (S510), generates a reference block directed by the current motion vector (S520), calculates a motion compensation coefficient by using pixels neighboring the current block and pixels neighboring the reference block (S530), generates a changed reference block in which the motion compensation coefficient is reflected (S540), calculates an encoding cost for the reference block (S550), and calculates an encoding cost for the changed reference block (S560). The predictor 110 determines whether the encoding cost for the reference block is larger than the encoding cost for the changed reference block (S870), and determines the changed reference block as the predicted block of the current block when the encoding cost for the reference block is larger than the encoding cost for the changed reference block (S580), and determines the reference block as the predicted block of the current block when the encoding cost for the reference block is equal to or smaller than the encoding cost for the changed reference block (S590).

Figure 6:
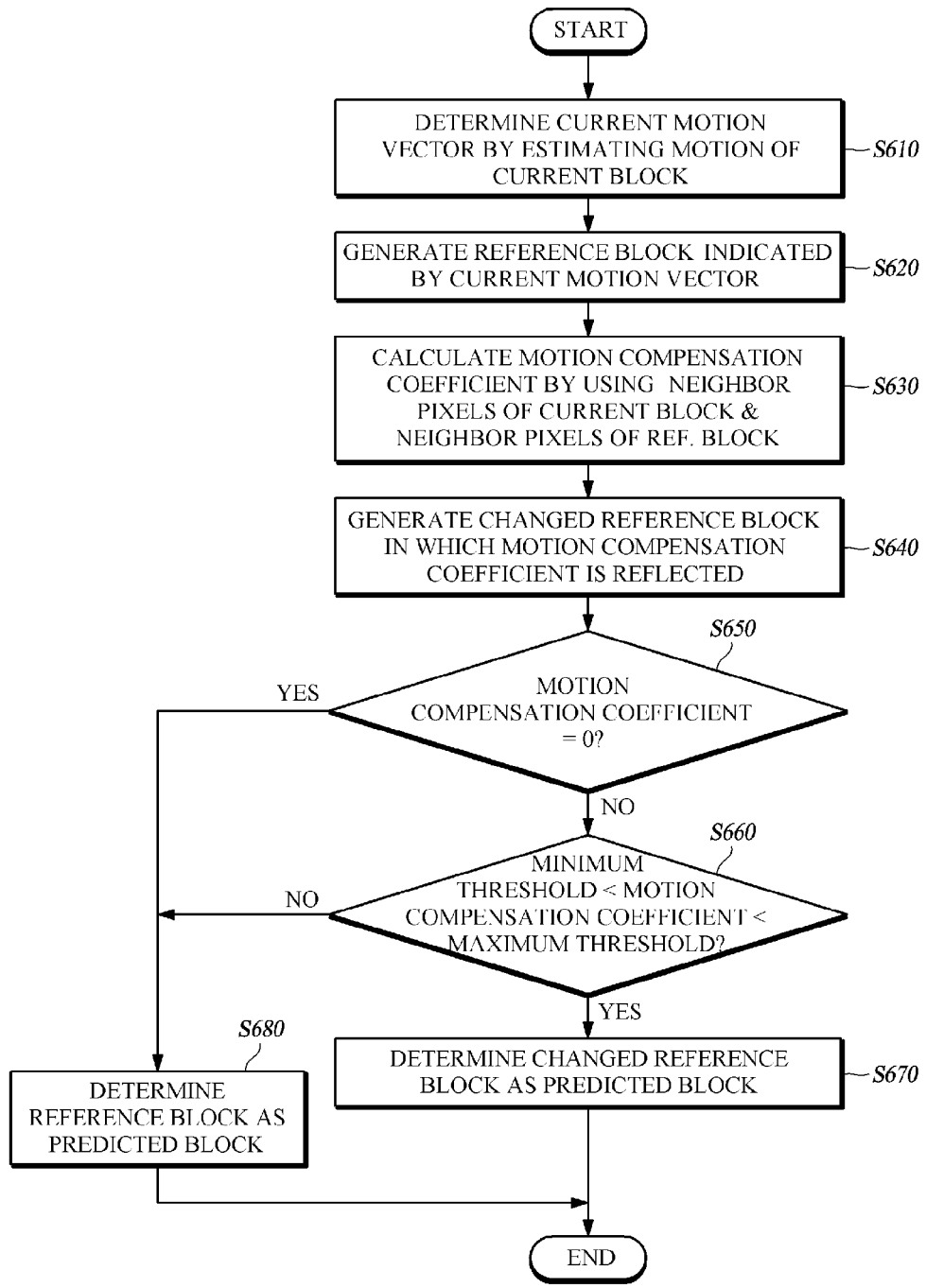
FIG. 6 is a flowchart illustrating another example of an inter prediction method for a predictive encoding according to the first embodiment of the present disclosure.

FIG. 6 is a flowchart illustrating another example of the inter prediction method for the predictive encoding according to the first embodiment of the present disclosure.

The inter prediction method for a predictive encoding according to the first embodiment of the present disclosure may be implemented as illustrated in FIG. 6. That is, the predictor 110 may generate a predicted block by determining whether to perform a motion compensation on a current block with an application of a motion compensation coefficient based on a value of the motion compensation coefficient. Referring to FIG. 6, the predictor 110 determines a current motion vector by estimating motion of a current block (S610), generates a reference block directed by the current motion vector (S620), calculates a motion compensation coefficient by using pixels neighboring the current block and pixels neighboring the reference block (S630), generates a changed reference block in which the motion compensation coefficient is reflected (S640), determines whether a value of the motion compensation coefficient is "0" (S650), determines whether the value of the motion compensation coefficient belongs to a predetermined range, i.e. is larger than a minimum threshold and smaller than a maximum threshold when the value of the motion compensation coefficient is not "0" (S660), determines the changed reference block as a predicted block of the current block when the value of the motion compensation coefficient belongs to the predetermined range (S670), and determines the reference block as a predicted block of the current block when the value of the motion compensation coefficient is "0" as a result of a determination in step S650 or the value of the motion compensation coefficient does not belong to the predetermined range as a result of a determination in step S660 (S680).

FIG. 6 illustrates the performance of both steps S650 and S660, but only one between steps S650 and S660 may be performed. That is, the predictor 110 is not essentially necessary to determine the changed reference block as the predicted block of the current block only when the value of the motion compensation coefficient is not "0" and belongs to the predetermined range, and the predictor 110 may determine the changed reference block as the predicted block of the current block regardless of whether the value of the motion compensation coefficient belongs to the predetermined range when the value of the motion compensation coefficient is not "0", and likewise, the predictor 110 may also determine the changed reference block as the predicted block of the current block when the value of the motion compensation coefficient belongs to the predetermined range even if the value of the motion compensation coefficient is "0".

Further, it is not essentially necessary to perform the respective steps described with reference to FIGS. 5 and 6 and a part of the steps may be selectively omitted or a step may be additionally added. Further, an order of the respective steps is not limited to the order of FIGS. 5 and 6, and a part or an entirety of the steps may be changed or even performed in parallel.

Figure 7:
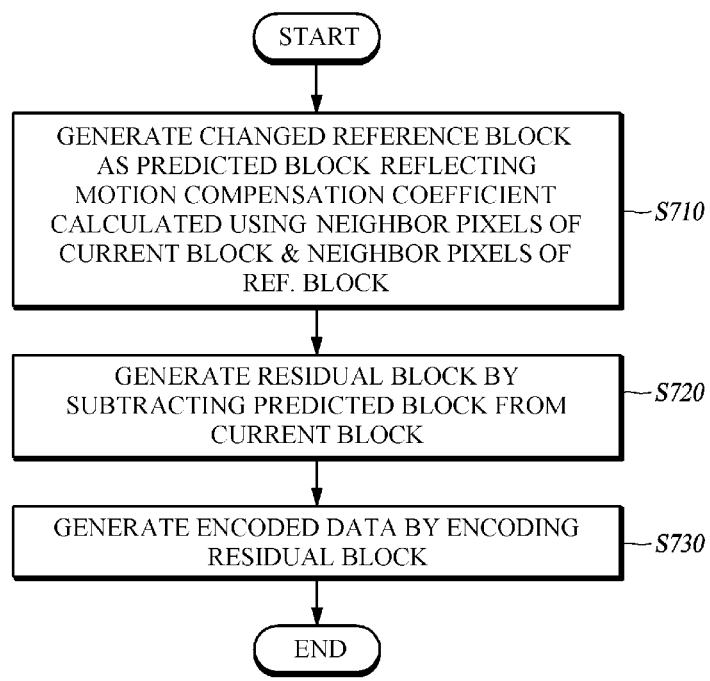
FIG. 7 is a flowchart illustrating a video encoding method according to the first embodiment of the present disclosure.

FIG. 7 is a flowchart illustrating a video encoding method according to the first embodiment of the present disclosure.

The video encoding apparatus 100 generates a changed reference block generated by reflecting a motion compensation coefficient calculated using pixels neighboring the current block and pixels neighboring the reference block in a reference block directed by a current motion vector as a predicted block of a current block (S710), generates a residual block by subtracting the predicted block from the current block (S720), and generates encoded data by encoding a residual block (S730).

In step S710, the video encoding apparatus 100 may generate the changed reference block as the predicted block of the current block based on an encoding cost for the reference block and an encoding cost for the changed reference block, and in this case motion compensation coefficient usage information indicating use of the motion compensation coefficient may be inserted in the encoded data. For example, when the video encoding apparatus 100 generates the changed reference block as the predicted block of the current block because the encoding cost for the reference block is larger than the encoding cost for the changed reference block, the video encoding apparatus 100 inserts the motion compensation coefficient usage information indicating the use of the motion compensation coefficient (e.g. flag "1") in the encoded data, and when the video encoding apparatus 100 generates the reference block as the predicted block of the current block because the encoding cost for the reference block is equal to or smaller than the encoding cost for the changed reference block, the video encoding apparatus 100 does not insert the motion compensation coefficient usage information indicating the non-use of the motion compensation coefficient (e.g. flag "0") in the encoded data.

Further, in step S710, the video encoding apparatus 100 may generate the changed reference block as the predicted block of the current block based on the value of the motion compensation coefficient, and in this event, the video encoding apparatus 100 does not generate the motion compensation coefficient usage information indicating the use of the motion compensation coefficient, or does not insert the motion compensation coefficient usage information indicating the use of the motion compensation coefficient in the encoded data even if the video encoding apparatus 100 generates the motion compensation coefficient usage information. This is because, in a case in which the video encoding apparatus 100 generates the changed reference block as the predicted block of the current block based on the value of motion compensation coefficient, even if it does not insert the motion compensation coefficient usage information in the encoded data, a video decoding apparatus to be described later may determine whether to compensate for motion of a corresponding block through application of the motion compensation coefficient.

Figure 8:
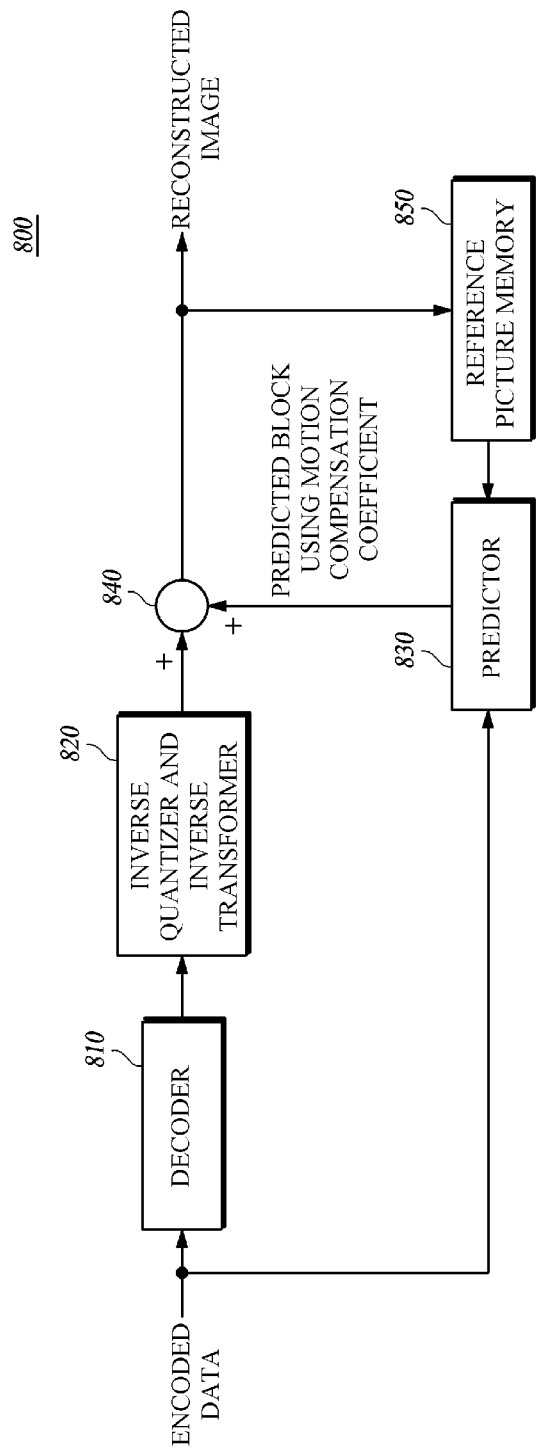
FIG. 8 is a block diagram schematically illustrating a video decoding apparatus according to the first embodiment of the present disclosure.

FIG. 8 is a block diagram schematically illustrating a video decoding apparatus according to the first embodiment of the present disclosure.

The video decoding apparatus according to the first embodiment of the present disclosure may include a decoder 810, an inverse quantizer and inverse transformer 820, a predictor 830, an adder 840, and a reference picture memory 850.

The decoder 810 reconstructs a quantized residual block having the current motion vector and a quantized transform coefficient by decoding the encoded data. Specifically, the decoder 810 extracts a quantized transform coefficient string by decoding the encoded data, and inversely scans the quantized transform coefficient string with various inverse-scanning methods including an inverse zigzag scanning, to reconstruct the residual block having the quantized transform coefficient. In this event, the decoder 810 may extract the encoded residual block from a first field included in the encoded data and decode the extracted residual block, and extract information necessary for the prediction from a second field included in the encoded data or decode extracted information, and transfer the extracted information or the extracted and decoded information necessary for the prediction to the predictor 830, such that the predictor 830 may predict the current block in the same method performed in the predictor 110 of the video encoding apparatus 100. Further, when the motion compensation coefficient usage information is included in the second field of the encoded data, the decoder 830 may extract the motion compensation coefficient usage information and transfer the extracted motion compensation coefficient usage information to the predictor 830.

The inverse quantizer and inverse transformer 820 generates the inversely quantized residual block by inversely quantizing the quantized residual block decoded and reconstructed by the decoder 810 and reconstructs the residual block having the residual signal by inversely transforming the inversely quantized residual block.

FIG. 8 illustrates the independent implementation of the decoder 810 and the inverse quantizer and inverse transformer 820, but the respective functions of the independent implementation of the decoder 810 and the inverse quantizer and inverse transformer 820 may be combined and implemented in one decoder. As such, when the respective functions of the independent implementation of the decoder 810 and the inverse quantizer and inverse transformer 820 may be combined and implemented, the decoder may reconstruct the current motion vector and the residual block by decoding the encoded data, and extract the motion compensation coefficient usage information from the encoded data if necessary.

The predictor 830 generates a changed reference block generated by reflecting the motion compensation coefficient calculated using pixels neighboring the current block and pixels neighboring the reference block in a reference block directed by the current motion vector decoded and reconstructed from the encoded data as a predicted block of the current block. Specifically, the predictor 830 generates the predicted block of the current block by using information, such as the current motion vector and the motion compensation coefficient usage information, necessary for a prediction. In this case, when the predictor 830 receives the motion compensation coefficient usage information from the decoder 810, the predictor 830 may determine whether to compensate for motion of the current block through an application of the motion compensation coefficient based on the motion compensation coefficient usage information transferred in the generation of the predicted block, to generate the predicted block. The predictor 830 will be described in the following descriptions with reference to FIG. 9 in detail.

The adder 840 generates the current block by adding the residual block reconstructed by the inverse quantizer and inverse transformer 820 and the predicted block generated by the predictor 830. The current block reconstructed by the adder 840 may be transferred to the reference frame memory 850, and accumulated in the unit of pictures and stored as the reference picture in the reference frame memory 850, and the reference picture may be used for a prediction of another block or another frame by the predictor 830.

Although it is not illustrated in FIG. 8, the video decoding apparatus 800 according to the first embodiment of the present disclosure may further include an intra predictor for the intra prediction, a deblocking filter for the deblocking-filtering of the reconstructed current block, etc. Further, the inverse quantizer and inverse transformer 820 may additionally perform the inverse transform and inverse quantization on a specific picture (e.g. an intra picture).

Figure 9:
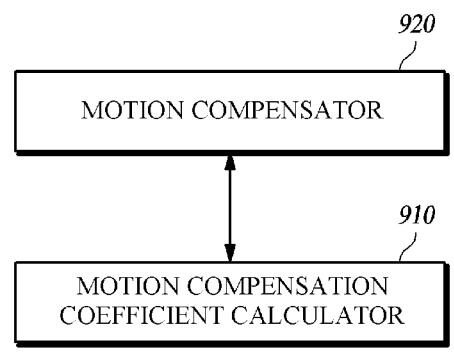
FIG. 9 is a block diagram schematically illustrating an inter prediction apparatus for a predictive decoding according to the first embodiment of the present disclosure.

FIG. 9 is a block diagram schematically illustrating an inter prediction apparatus for a predictive decoding according to the first embodiment of the present disclosure.

The inter prediction apparatus for a predictive decoding according to the first embodiment of the present disclosure may be implemented as the predictor 830 in the video decoding apparatus 800 according to the first embodiment of the present disclosure aforementioned with reference to FIG. 8, and so is called the predictor 830 for convenience of description hereinafter.

The predictor 830 may include a motion compensation coefficient calculator 910 and a motion compensator 920.

The motion compensation coefficient calculator 910 generates a reference block directed by a reconstructed current motion vector decoded by decoding the encoded data and calculates the motion compensation coefficient by using the pixels neighboring the current block and the pixels neighboring the reference block. Specifically, when the motion compensation coefficient calculator 910 receives the current motion vector reconstructed by the decoder 810 from the decoder 810 or the motion compensator 920, the motion compensation coefficient calculator 910 generates the reference block directed by the reconstructed current motion vector and calculates the motion compensation coefficient by using the pixels neighboring the current block and the pixels neighboring the reference block. A process of calculating the motion compensation coefficient by using the pixels neighboring the current block and the pixels neighboring the reference block by the motion compensation coefficient calculator 910 is the same as or similar to a process of calculating the motion compensation coefficient by the motion compensation coefficient calculator 220 aforementioned through FIGS. 2 to 4, so its detailed description will be omitted.

The motion compensator 920 generates a changed reference block by reflecting the motion compensation coefficient in the reference block and determines the changed reference block as the predicted block of the current block. Here, the motion compensator 920 may determine the changed reference block as the predicted block of the current block based on the motion compensation coefficient usage information or the motion compensation coefficient.

For example, when the motion compensation coefficient calculator 910 receives the motion compensation coefficient usage information from the decoder 810, the motion compensator 920 may determine the changed reference block as the predicted block of the current block when the motion compensation coefficient usage information indicates the use of the motion compensation coefficient, and determine the reference block as the predicted block of the current block when the motion compensation coefficient usage information indicates the non-use of the motion compensation coefficient. That is, when the motion compensation coefficient usage information is included in the encoded data, the video encoding apparatus 100 has determined whether to compensate for the motion of the current block through the application of the motion compensation coefficient based on the encoding cost for the reference block and the encoding cost for the changed reference block. Thus, the motion compensator 920 may determine whether the motion compensation coefficient usage information indicates the use of the motion compensation coefficient (e.g. flag "1") or the non-use of the motion compensation coefficient (e.g. flag "0") and determine whether to determine the changed reference block or the reference block as the predicted block of the current block.

For another example, the motion compensation coefficient calculator 910 may determine the changed reference block as the predicted block of the current block when a value of the motion compensation coefficient is not "0" and determine the reference block as the predicted block of the current block when a value of the motion compensation coefficient is "0", or determine the changed reference block as the predicted block of the current block when a value of the motion compensation coefficient belongs to the predetermined range and determine the reference block as the predicted block of the current block when a value of the motion compensation coefficient does not belong to the predetermined range. That is, when the motion compensation coefficient usage information is not included in the encoded data, the video encoding apparatus 100 has determined whether to compensate for the motion of the current block through the application of the motion compensation coefficient based on the value of the motion compensation coefficient, so the motion compensation coefficient calculator 910 may determine if the value of the motion compensation coefficient meets a predetermined condition (i.e. whether the value of the motion compensation coefficient is "0" and/or whether the value of the motion compensation coefficient belongs to the predetermined range) according to a method previously appointed with the video encoding apparatus 100, to determine the changed reference block or the reference block as the predicted block of the current block according to the determination.

Hereinafter, an inter predictive method for a predictive decoding performed by the predictor 830 aforementioned with reference to FIG. 8 will be described.

According to the inter predictive method for a predictive decoding, the predictor 830 generates a reference block directed by a current motion vector reconstructed by decoding the encoded data, calculates a motion compensation coefficient by using pixels neighboring the current block and pixels neighboring the reference block, generates a changed reference block by reflecting the motion compensation coefficient in the reference block, and determines the changed reference block as a predicted block of a current block.

Here, the predictor 830 may determine the changed reference block as the predicted block of the current block when the motion compensation coefficient usage information extracted from the encoded data indicates the use of the motion compensation coefficient, and determine the reference block as the predicted block of the current block when the motion compensation coefficient usage information extracted from the encoded data indicates the non-use of the motion compensation coefficient.

Further, the predictor 830 may determine the changed reference block as the predicted block of the current block when the value of the motion compensation coefficient is not "0" and determine the reference block as the predicted block of the current block when the value of the motion compensation coefficient is "0", or determine the changed reference block as the predicted block of the current block when the value of the motion compensation coefficient belongs to the predetermined range and determine the reference block as the predicted block of the current block when the value of the motion compensation coefficient does not belong to the predetermined range.

Figure 10:
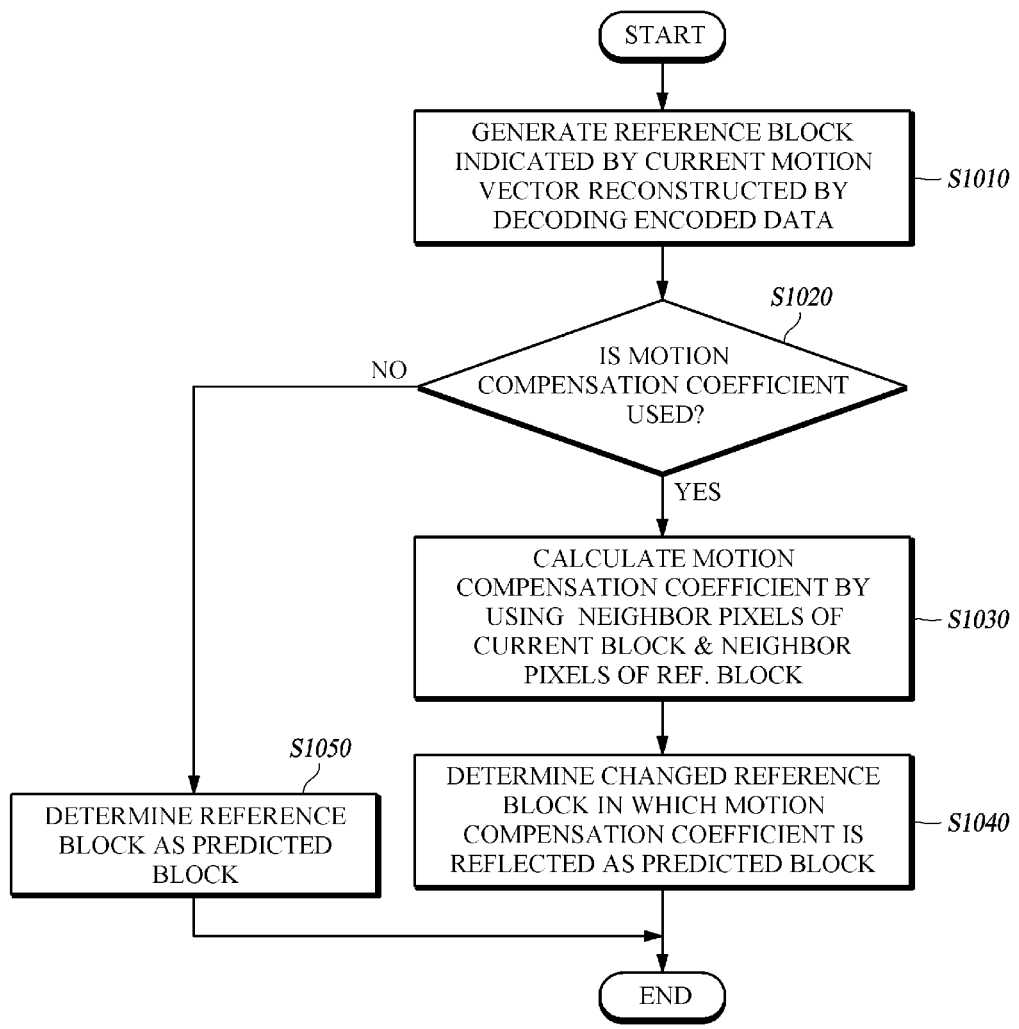
FIG. 10 is a flowchart illustrating an example of an inter prediction method for a predictive decoding according to the first embodiment of the present disclosure.

FIG. 10 is a flowchart illustrating an example of an inter prediction method for a predictive decoding according to the first embodiment of the present disclosure.

The inter prediction method for a predictive decoding according to the first embodiment of the present disclosure may be implemented as illustrated in FIG. 10. That is, the predictor 830 may generate the predicted block by determining whether to perform the motion compensation on the current block through the application of the motion compensation coefficient based on the motion compensation coefficient usage information.

Referring to FIG. 10, the predictor 830 generates a reference block directed by a reconstructed current motion vector by decoding the encoded data (S1010), determines if the motion compensation coefficient usage information extracted from the encoded data indicates the use of a motion compensation coefficient (S1020), calculates the motion compensation coefficient by using pixels neighboring the current block and pixels neighboring the reference block when the motion compensation coefficient usage information indicates the use of the motion compensation coefficient (S1030), determines a changed reference block, in which the motion compensation coefficient is reflected, as a predicted block of a current block (S1040), and determines a reference block, in which the motion compensation coefficient is not reflected, as a result of determination of step S1020 as a predicted block of a current block (S1050).

Figure 11:
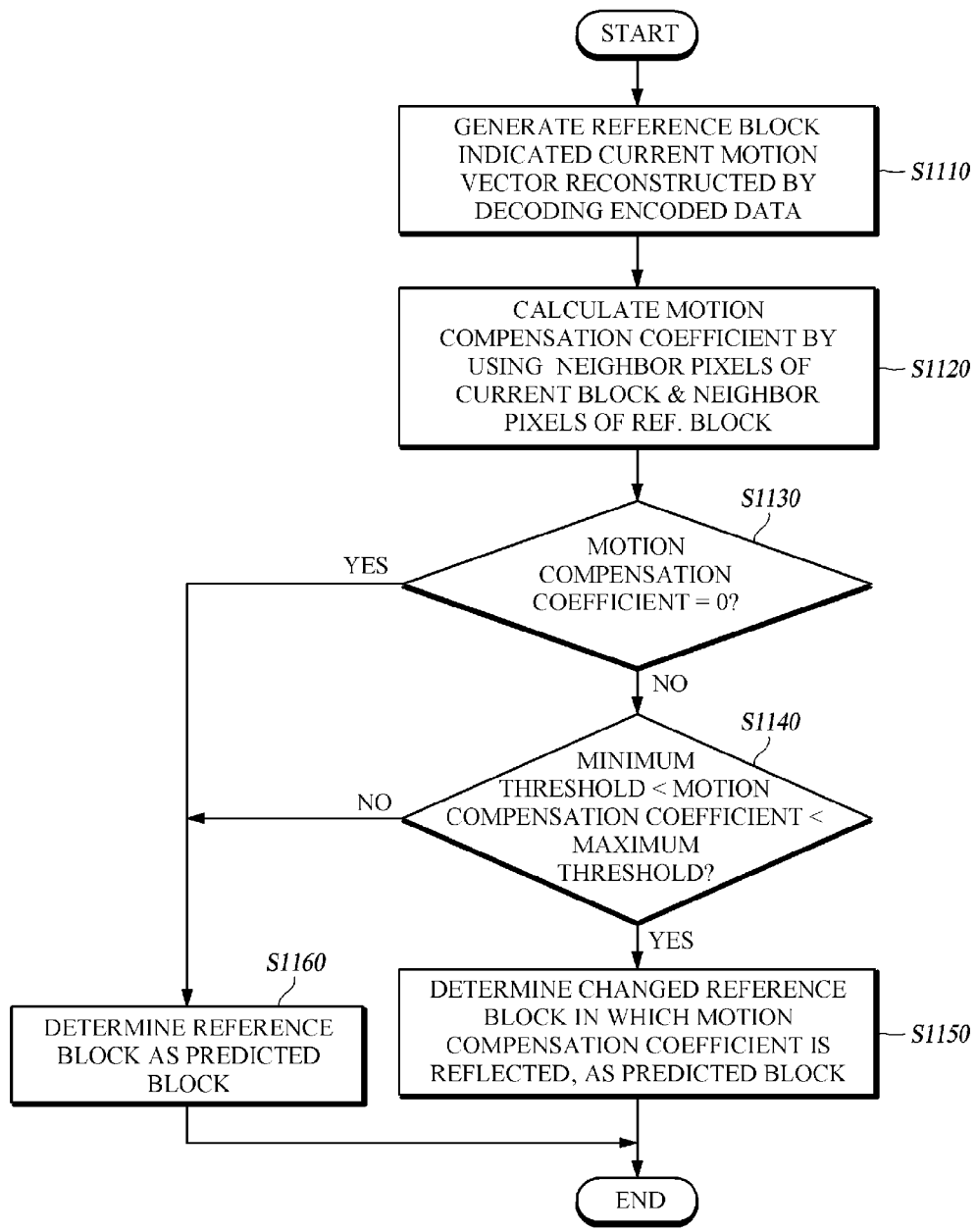
FIG. 11 is a flowchart illustrating another example of an inter prediction method for a predictive decoding according to the first embodiment of the present disclosure.

FIG. 11 is a flowchart illustrating another example of the inter prediction method for a predictive decoding according to the first embodiment of the present disclosure.

The inter prediction method for a predictive decoding according to the first embodiment of the present disclosure may be implemented as illustrated in FIG. 11. That is, the predictor 830 may generate a predicted block by determining whether to perform the motion compensation on a current block with an application of a motion compensation coefficient based on a value of the motion compensation coefficient. Referring to FIG. 11, the predictor 830 generates a reference block directed by a current motion vector reconstructed by decoding the encoded data (S1110), calculates a motion compensation coefficient by using pixels neighboring the current block and pixels neighboring the reference block (S1120), determines if a value of the motion compensation coefficient is "0" (S1130), determines if the value of the motion compensation coefficient belongs to a predetermined range, i.e. if the value of the motion compensation coefficient is larger than a minimum threshold and smaller than a maximum threshold when a value of the motion compensation coefficient is not "0" (S1140), determines the changed reference block as the predicted block of the current block when the value of the motion compensation coefficient belongs to the predetermined range (S1150), and determines the reference block as the predicted block of the current block when the value of the motion compensation coefficient is "0" as a result of determination in step S1130 or when the value of the motion compensation coefficient does not belong to the predetermined range as a result of determination in step S1140 (S1160).

FIG. 11 illustrates the performance of both steps S1130 and S1140, but only one between steps S1130 and S1140 may be performed. That is, the predictor 830 is not essentially necessary to determine the changed reference block as the predicted block of the current block only when the value of the motion compensation coefficient is not "0" and belongs to the predetermined range, and the predictor 830 may determine the changed reference block as the predicted block of the current block regardless of whether the value of the motion compensation coefficient belongs to the predetermined range when the value of the motion compensation coefficient is not "0", and likewise, the predictor 110 may also determine the changed reference block as the predicted block of the current block when the value of the motion compensation coefficient belongs to the predetermined range even if the value of the motion compensation coefficient is "0".

Further, it is not essentially necessary to perform the respective steps described with reference to FIGS. 10 and 11 and a part of the steps may be selectively omitted or a step may be additionally added. Further, an order of the respective steps is not limited to the order of FIGS. 10 and 11, and a part or an entirety of the steps may be changed or even performed in parallel.

Figure 12:
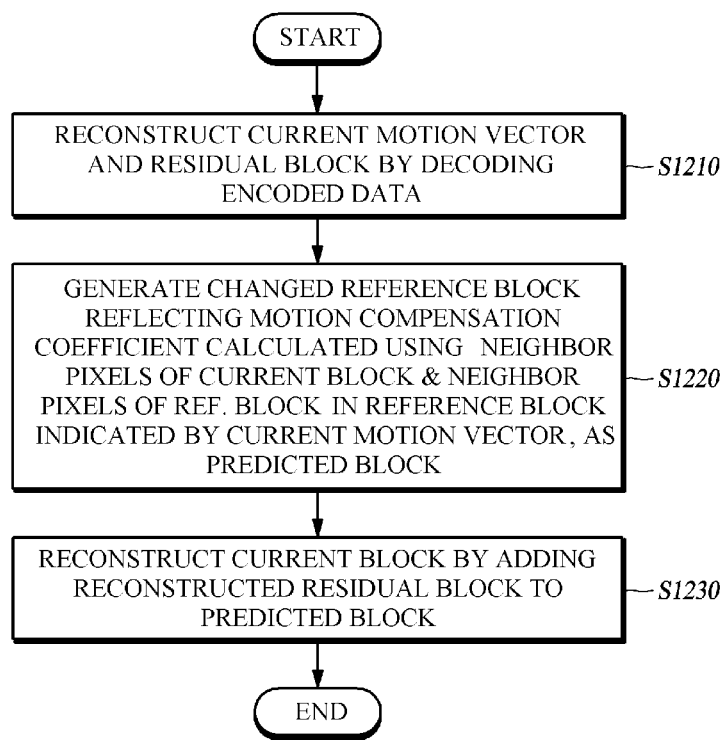
FIG. 12 is a flowchart illustrating a video decoding method according to the first embodiment of the present disclosure.

FIG. 12 is a flowchart illustrating a video decoding method according to the first embodiment of the present disclosure.

The video decoding apparatus 800 reconstructs the current motion vector and the residual block by decoding the encoded data (S1210), generates a changed reference block generated by reflecting a motion compensation coefficient calculated using pixels neighboring the current block and pixels neighboring the reference block to a reference block directed by the reconstructed current motion vector as a predicted block of a current block (S1220), and reconstructs the current block by adding the reconstructed residual block and the predicted block (S1230).

To this end, the video decoding apparatus 800 may extract motion compensation coefficient usage information from the encoded data. In this event, the video decoding apparatus 800 may determine the changed reference block as the predicted block of the current block when the motion compensation coefficient usage information indicates the use of the motion compensation coefficient in step S1220, and determine the reference block as the predicted block of the current block when the motion compensation coefficient usage information indicates the non-use of the motion compensation coefficient.

Further, the video decoding apparatus 800 may determine whether to apply the motion compensation coefficient by itself without extraction of the motion compensation coefficient usage information from the encoded data. Specifically, when the video decoding apparatus 800 does not extract the motion compensation coefficient usage information from the encoded data, the video decoding apparatus 800 may determine the changed reference block as the predicted block of the current block when a value of the motion compensation coefficient is not "0" and determine the reference block as the predicted block of the current block when a value of the motion compensation coefficient is "0". Otherwise, the video decoding apparatus 800 may determine the changed reference block as the predicted block of the current block when a value of the motion compensation coefficient belongs to a predetermined range and determine the reference block as the predicted block of the current block when a value of the motion compensation coefficient does not belong to the predetermined range.

As described above, according to the first embodiment of the present disclosure, it is possible to decrease a difference between an actual block and a predicted block and thus improve the compression efficiency by adaptively calculating a motion compensation coefficient according to a characteristic of an image, reflecting the motion compensation coefficient in the predicted block, and more accurately predicting a block to be encoded.

Figure 13:
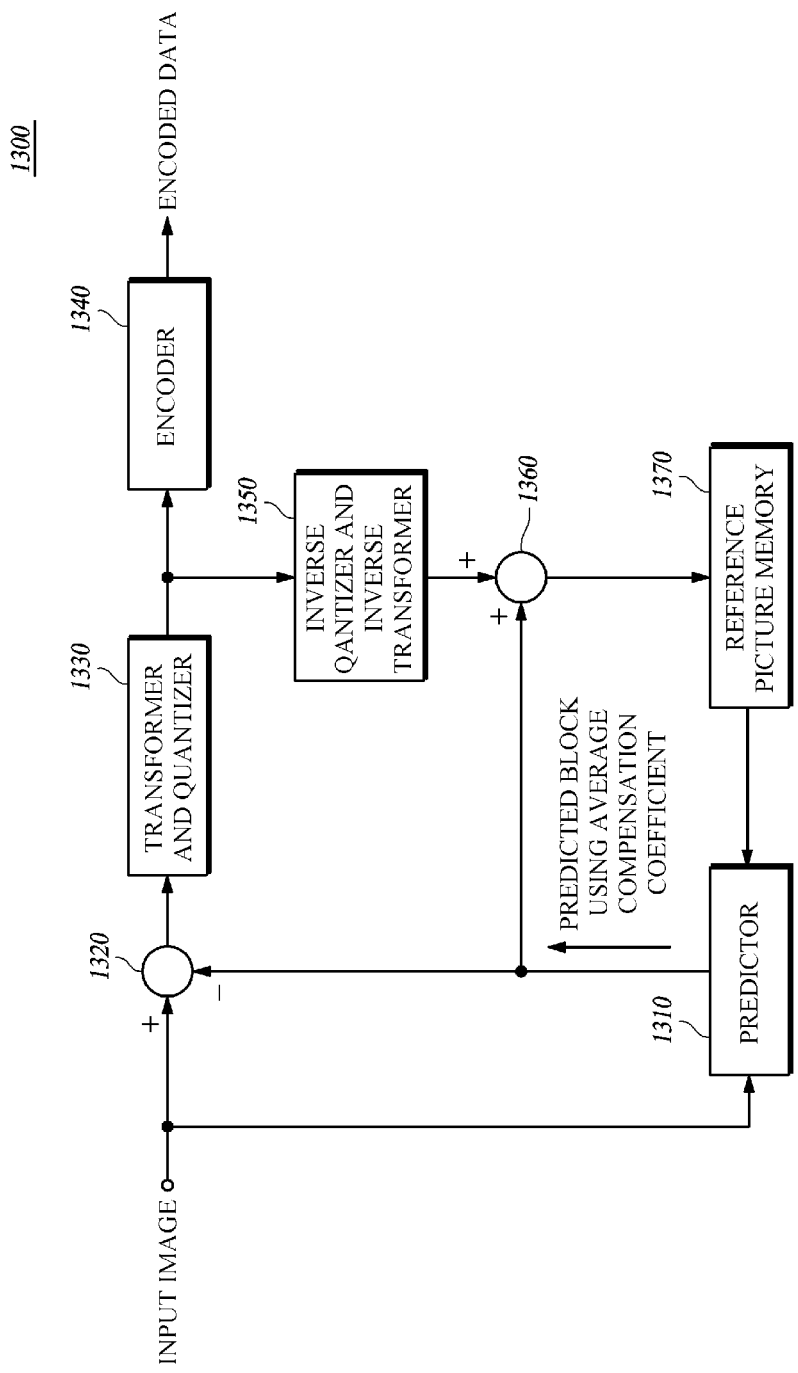
FIG. 13 is a block diagram schematically illustrating a video encoding apparatus according to a second embodiment of the present disclosure.

FIG. 13 is a block diagram schematically illustrating a video encoding apparatus according to a second embodiment of the present disclosure.

A video encoding apparatus 1300 according to the second embodiment of the present disclosure, which is an apparatus for encoding an image, includes a predictor 1310, a subtracter 1320, a transformer and quantizer 1330, an encoder 1340, an inverse quantizer and inverse transformer 1350, an adder 1360, and a reference picture memory 1370.

The video encoding apparatus 1300 according to the second embodiment of the present disclosure illustrated in FIG. 13 has a general construction which is not greatly different from that of the video encoding apparatus 100 according to the first embodiment of the present disclosure described with reference to FIG. 1. That is, the technical contents of the subtracter 1320, the transformer and quantizer 1330, etc. of the video encoding apparatus 1300 according to the second embodiment of the present disclosure are not different from those of the subtracter 120, the transformer and quantizer 130, etc. of the video encoding apparatus 100 described in the first embodiment of the present disclosure, so detailed contents thereof are to be substituted with the contents of the first embodiment and further description thereof will be omitted.

However, there is a difference in that the predictor 1310 of the video encoding apparatus 1300 according to the second embodiment of the present disclosure generates a predicted block by using an average compensation coefficient, but the predictor 110 of the video encoding apparatus 100 according to the first embodiment of the present disclosure generates a predicted block by using a motion compensation coefficient, so the difference will be described in more detail.

The predictor 1310 generates a predicted block by performing an inter prediction on a block to be encoded (hereinafter, referred to as "the current block"). That is, the predictor 1310 determines motion information of a current block containing a motion vector and a reference picture index by estimating motion of the current block in a previous picture which has been reconstructed through previous encoding and decoding according to an inter prediction mode, and generates the predicted block by using the motion information of the current block.

Further, in the generation of the predicted block, the predictor 1310 may generate the predicted block by using adjacent pixels of the current block (or called "pixels neighboring the current block") and adjacent pixels of the reference block (or called "pixels neighboring the reference block") selected based on the motion information of the current block and motion information of neighboring blocks of the current block. That is, the predictor 1310 may generate a changed reference block by reflecting an average compensation coefficient, which is calculated by using pixels neighboring the current block and pixels neighboring the reference block selected based on the motion information of the current block and motion information of neighboring blocks of the current block, in a reference block directed by the motion information of the block determined by estimating the motion of the current block and determine the changed reference block as the predicted block of the current block.

Here, the current block may be a macroblock, but may be a subblock divided from the macroblock in transform units. The transform unit refers to a pixel size based on which the transformer and quantizer 1330 transforms and quantizes a residual block, and may have various sizes, such as 16×16, 8×16, 16×8, 8×8, 8×4, 4×8, and 4×4. The neighboring block may be a block, which has been reconstructed through previous encoding and decoding, among blocks adjacent to the current block.

Further, the predictor 1310 may determine a more efficient block between the reference block and the changed reference block as the predicted block of the current block. That is, in order to determine the use of the average compensation coefficient, the predictor 1310 may determine a more efficient block between the reference block and the changed reference block as the predicted block of the current block by using a method including a rate-distortion optimization or by analyzing the characteristic of the adjacent pixels. The predictor 1310 may be described in the following description with reference to FIG. 14.

Figure 14:
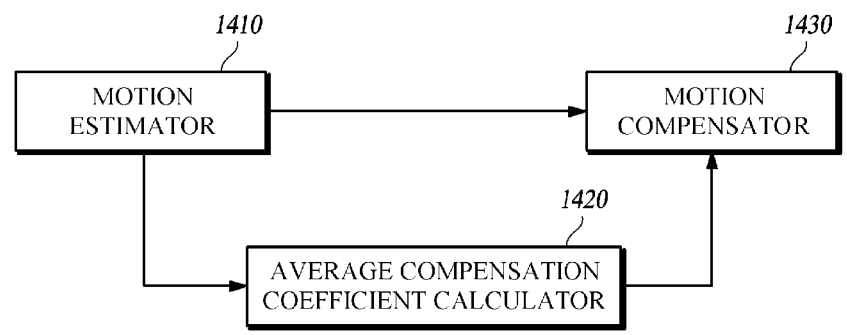
FIG. 14 is a block diagram schematically illustrating an inter prediction apparatus for a predictive encoding according to the second embodiment of the present disclosure.

FIG. 14 is a block diagram schematically illustrating an inter prediction apparatus for a predictive encoding according to the second embodiment of the present disclosure.

The inter prediction apparatus for a predictive encoding according to the second embodiment of the present disclosure may be implemented as the predictor 1310 in the video encoding apparatus 1300 according to the second embodiment of the present disclosure aforementioned with reference to FIG. 13, so it is called "the predictor 1310" hereinafter for convenience of description.

The predictor 1310 may include a motion estimator 1410, an average compensation coefficient calculator 1420, and a motion compensator 1430.

The motion estimator 1410 determines the motion information of the current block by estimating the motion of the current block. That is, the motion estimator 1410 estimates the motion of the current block by searching for a position of the reference block which has the smallest difference with the current block in a picture obtained by up-sampling the picture which has been reconstructed through previous encoding and decoding. In this event, the space between the pixels may be interpolated for the up-sampling of the picture, and a filter used for the interpolation may be either a fixed 6-tap filter or an adaptive interpolation filter optimized in the unit of pictures or blocks. The motion vector indicating the reference block having the smallest difference with the current block is obtained as the motion vector of the current block, and an index indicating a reference picture including a corresponding reference block is obtained as a reference picture index.

The average compensation coefficient calculator 1420 generates the reference block directed by the motion information of the current block, and calculates the average compensation coefficient by using the pixels neighboring the current block and the pixels neighboring the reference block which are selected based on the motion information of the current block and the motion information of the neighboring blocks of the current block. Specifically, the average compensation coefficient calculator 1420 calculates the motion compensation coefficient for a more accurate compensation of the motion of the current block by using the pixels neighboring the current block and the pixels neighboring the reference block.

In the selection of the pixels neighboring the current block and the pixels neighboring the reference block, when neighboring reference blocks directed by motion information of the neighboring blocks of the current block are the neighboring blocks of the reference block in the reference picture including the reference block, the average compensation coefficient calculator 1420 may select adjacent pixels located within the neighboring blocks of the current block and neighboring the current block as the pixels neighboring the current block, and select adjacent pixels located within the neighboring reference blocks indicated by the motion information of the neighboring blocks of the current block and neighboring the reference block as the pixels neighboring the reference block.

For example, when a reference picture index identified by the motion information of the current block is the same as a reference picture index identified by the motion information of the neighboring block of the current block and a difference between the motion vector identified by the motion information of the current block and a motion vector identified by the motion information of the neighboring block of the current block is equal to or smaller than a distance reference threshold, the average compensation coefficient calculator 1420 may select adjacent pixels located within the neighboring blocks of the current block and neighboring the current block as the pixels neighboring the current block, and select adjacent pixels located within the neighboring reference blocks indicated by the motion vectors of the neighboring blocks of the current block and neighboring the reference block as the pixels neighboring the reference block. In this case, when a distance between the motion vector of the current block and the motion vector of the neighboring block of the current block is equal to or smaller than a reference threshold, the average compensation coefficient calculator 1420 may determine that the difference between the motion vector of the current block and the motion vector of the neighboring block of the current block is equal to or smaller than the reference threshold. Further, the average compensation coefficient calculator 1420 may calculate the distance between the motion vector of the current block and the motion vector of the neighboring block of the current block by using various geometrical distance measurement methods, such as Euclidean Distance and City Block Distance.

Figure 15:
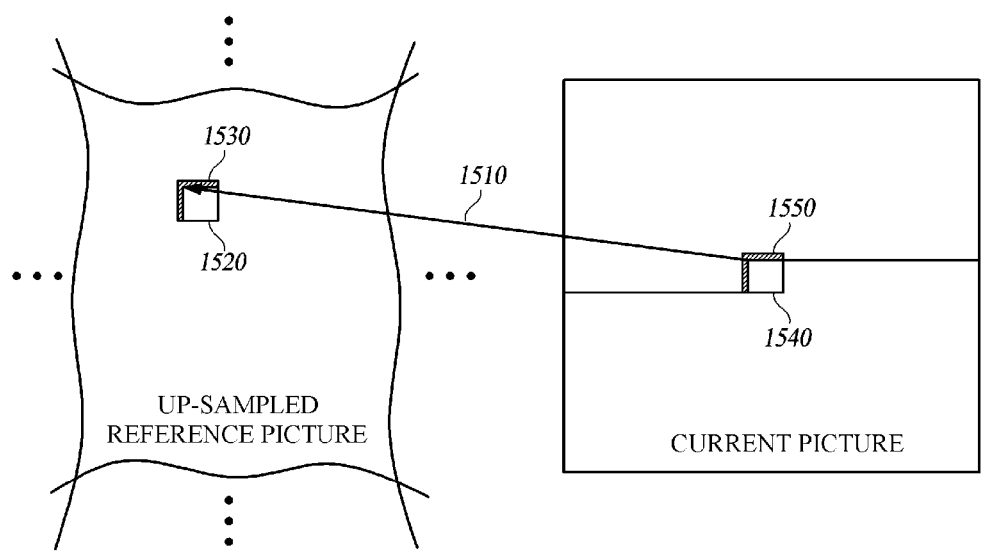
FIG. 15 is a view illustrating adjacent pixels for a calculation of an average compensation coefficient according to the second embodiment of the present disclosure.

FIG. 15 is a view illustrating adjacent pixels for a calculation of an average compensation coefficient according to the second embodiment of the present disclosure.

FIG. 15 illustrates an example of pixels usable as the pixels neighboring the current block and the pixels neighboring the reference block when the current block is a macroblock. The average compensation coefficient may be calculated with a difference between an average of the pixels neighboring the current block and an average of the pixels neighboring the reference block. When the motion of the current block 1540 is estimated by searching for the reference block 1520 having a minimum difference with the current block 1540 within the current picture, the motion vector 1510 of the current block and the reference picture index may be obtained. As illustrated in FIG. 15, the pixels 1550 neighboring the current block may be pixels adjacent to the current block 1540, and the pixels 1530 neighboring the reference block may be pixels adjacent to the reference block 1520.

Figure 16A:
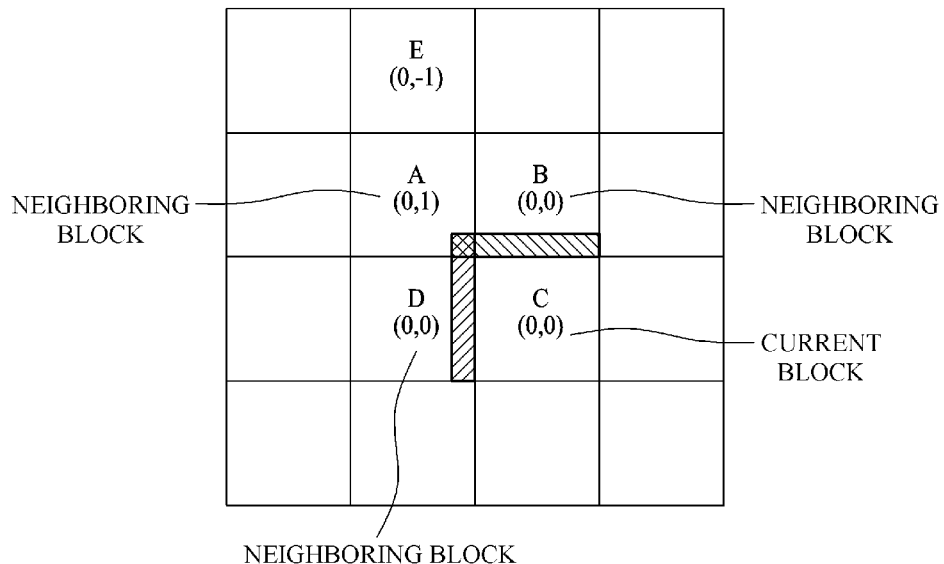
FIGS. 16A and 16B are diagrams illustrating neighboring blocks of a current block, neighboring blocks of a reference block, and corresponding adjacent pixels selected for calculation of an average compensation coefficient according to the second embodiment of the present disclosure.
Figure 16B:
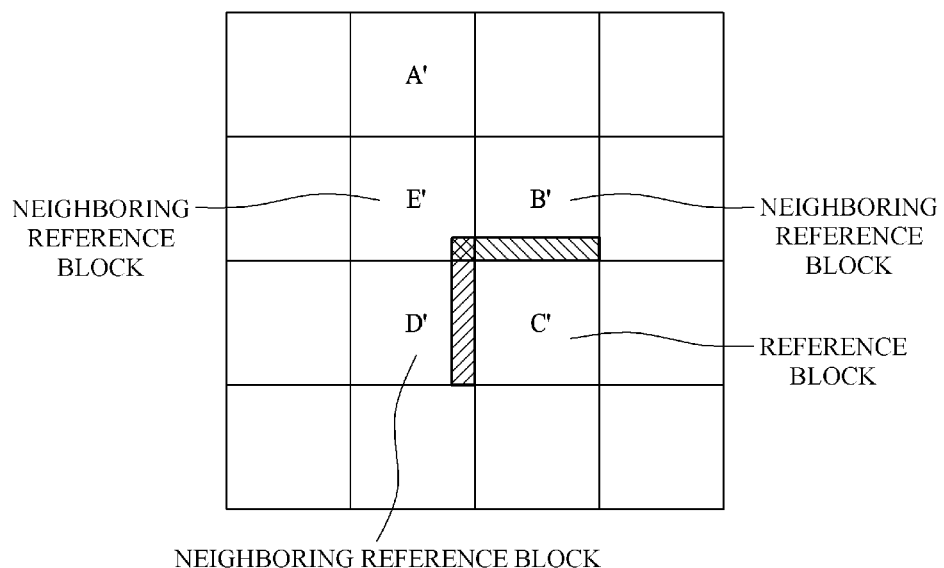

FIGS. 16A and 16B are diagrams illustrating neighboring blocks of the current block, neighboring blocks of the reference block, and corresponding adjacent pixels selected for calculation of an average compensation coefficient according to the second embodiment of the present disclosure.

FIGS. 16A and 16B illustrate examples of neighboring blocks and adjacent pixels used for calculation of an average compensation coefficient when the current block is a subblock having a size of 4×4 which is divided from the macroblock of the current block having a size of 16×16 in the transform units of 4×4 among transform units. However, FIG. 16 corresponds to a simple example for description, and a macroblock having a different size and a subblock having a different size may be applied similarly to FIG. 16.

FIG. 16A illustrates an example of the current block of the current picture, the neighboring blocks of the current block, and the adjacent pixels of the current block. As illustrated in FIG. 16A, assuming that the current block of the current picture is block C, block A, block B, and block D may be selected as the neighboring blocks of the current block. Accordingly, pixels adjacent to block C, which is the current block, within block A, block B, and block D which are the neighboring blocks of the current block, may be selected as the pixels neighboring the current block. The pixels in parts with slash lines, , , and , may be selected as the pixels neighboring the current block, and the adjacent pixels neighboring the current block in block A are represented with , the is adjacent pixels neighboring the current block in block B are represented with , and the adjacent pixels neighboring the current block in block B are represented with . Block E represents a block which is not selected as the neighboring block of the current block within the current picture. The remaining vacant blocks may have the respective motion vectors, but will be omitted for convenience of description.

In this event, as illustrated in FIG. 16A, assuming that block A, block B, block C, block D, and block E have the same reference picture index and the respective motion vectors of the blocks are (0,4), (0,0), (0,0), (0,0), and (0,−4), the respective blocks in the reference picture directed by the reference picture index may be represented as FIG. 16B. Here, the motion vector and the reference picture index determined by the motion estimator 1410 may be used as the motion information of block A that is the current block, and since block A, block B, and block D which are the neighboring blocks of the current block are the blocks which have been reconstructed through previous encoding and decoding prior to the encoding of the current block, the motion vector and the reference picture index of each block have been already determined and stored, so that they may be used without an additional calculation or operation. Further, since the video decoding apparatus to be described may reconstruct the neighboring blocks of the current block through the decoding of the neighboring blocks in advance before the decoding of the current block, the video decoding apparatus may select the pixels neighboring the current block and the pixels neighboring the reference block in the same manner as the video encoding apparatus 1300.

FIG. 16B illustrates an example of the reference block of the reference picture, the neighboring blocks of the reference block, and the adjacent pixels of the reference block. As illustrated in FIG. 16B, the reference block directed by motion vector (0,0) of block C that is the current block may be represented as C', and the neighboring reference blocks directed by motion vectors (0,4), (0,0), and (0,0) of block A, block B, and block D which are the neighboring blocks of the current block may be represented as A', B', and D', respectively. Further, a block directed by motion vector (0,−4) of block E that is not the neighboring block of the current block may be represented as E.

Referring to FIGS. 16A and 16B, it can be seen that for block B and block D which are the neighboring blocks of block C that is the current block, block B' and D' which are the neighboring reference blocks directed by the motion vectors of block B and block D serve as the neighboring blocks of block C' that is the reference block, but for block A that is the neighboring block of the current block, block C' that is the reference block, but block A' that is the neighboring reference block directed by the motion vector of block A fails to serve as the neighboring block of block C' that is the reference block, and block E' directed by the motion vector of block E which has not been selected as the neighboring block of the current block serves as the neighboring block of block C' that is the reference block.

Accordingly, in FIG. 16A, the pixels in parts with slash lines, ◌, and ▨, , adjacent to block C, which is the current block, within block B and block D, in which the blocks directed by the reference picture index and the motion vector of the neighboring block of the current block still serve as the neighboring blocks of the reference block, may be selected as the pixels neighboring the current block. Similarly, in FIG. 16B, the pixels in parts with slash lines, ◌, and ▨, , adjacent to block C', which is the reference block, within block B' and D' may be selected as the pixels neighboring the reference block.

To this end, the average compensation coefficient calculator 1420 may determine if the motion information of the current block is the same as or similar to the motion information of the neighboring block by comparing the motion information of the current block and the motion information of the reference block, and determine if the blocks directed by the reference picture index and the motion vectors of the neighboring blocks of the current block still serve as the neighboring blocks of the reference block according to a determination. That is, when the reference picture index is the same as the reference picture index of the neighboring blocks of the current block and the motion vector of the current block is the same as the motion vector of the neighboring blocks of the current block, the average compensation coefficient calculator 1420 may determine that the blocks directed by the motion vectors and the reference picture index of the neighboring blocks of the current block still serve as the neighboring blocks of the reference block. Further, when the reference picture index is the same as the reference picture index of the neighboring blocks of the current block, and a difference between the motion vector of the current block and the motion vector of the neighboring block is equal to or smaller than the predetermined reference threshold although the motion vector of the current block is not the same as the motion vector of the neighboring block of the current block, the average compensation coefficient calculator 1420 determines that the motion information of the current block is similar to the motion information of the neighboring block, and determines that the blocks directed by the reference picture index and the motion vectors of the neighboring blocks of the current block still serve as the neighboring blocks of the reference block.

In this case, the average compensation coefficient calculator 1420 may use a distance of the motion vector in order to determine if the motion vector of the current block is the same as the motion vector of the neighboring block of the current block and if the motion vector of the neighboring block is equal to or smaller than the predetermined reference threshold although the motion vector of the current block is not the same as the motion vector of the neighboring block of the current block. That is, the average compensation coefficient calculator 1420 may calculate the distance of the motion vector of the current block and the distance of the motion vector of the neighboring block of the current block by using various geometrical distance measurement methods, such as Euclidean Distance and City Block Distance, and determine if a difference between the two distances is equal to or smaller than the reference threshold.

However, the pixels neighboring the current block and the neighboring block adjacent pixels are not necessarily selected through the method described with reference to FIGS. 16A and 16B, but may be selected through other various methods. For example, block A, block B, and block D are not necessarily selected as the neighboring blocks of the current block, and block F (not shown) in a right side of block B may be additionally selected as the neighboring block of the current block, and thus the pixels neighboring the current block and the pixels neighboring the reference block may be differently selected.

In the meantime, the average compensation coefficient calculated using the pixels neighboring the current block and the pixels neighboring the reference block selected as described above may be calculated with a difference between an average of the pixels neighboring the current block and an average of the pixels neighboring the reference block as expressed in Formula 5. The pixels neighboring the current block and the pixels neighboring the reference block are pixels which have been reconstructed through previous encoding and decoding before the encoding of the current block.

$$mc_{coeff} = m_r - m_c$$ Formula 5

In Formula 5, $m_r$ represents an average of the pixels neighboring the reference block, $m_c$ represents an average of the pixels neighboring the current block, and $m_{coeff}$ represents an average compensation coefficient.

Referring to FIG. 14 again, the motion compensator 1430 generates the changed reference block by reflecting the average compensation coefficient in the reference block and determines the changed reference block as the predicted block of the current block. Specifically, the motion compensator 1430 may determine one of the reference block directed by the motion information of the current block obtained in the motion estimator 1410 and the changed reference block generated by reflecting the average compensation coefficient calculated by the average compensation coefficient calculator 1420 in the reference block as the predicted block of the current block.

For example, the motion compensator 1430 may determine the changed reference block as the predicted block of the current block based on the encoding cost for the reference block and the encoding cost for the changed reference block. To this end, the motion compensator 1430 may calculate the encoding cost for the reference block and the encoding cost for the changed reference block, and determine the changed reference block as the predicted block of the current block when the encoding cost for the reference block is larger than the encoding cost for the changed reference block, and determine the reference block as the predicted block of the current block when the encoding cost for the reference block is equal to or smaller than the encoding cost for the changed reference block.

Here, the encoding cost for the reference block refers to an encoding cost required for the predictive encoding of the current block by using the reference block as the predicted block of the current block, and the encoding cost for the changed reference block refers to an encoding cost required for the predictive encoding of the current block by using the changed reference block as the predicted block of the current block. The encoding cost may use a rate-distortion cost, but it is not necessarily limited thereto, and may use any cost if the cost is required for the inter predictive encoding of the current block by using the reference block or the changed reference block as the predicted block.

For another example, the motion compensator 1430 may determine the changed reference block as the predicted block of the current block based on a value of the average compensation coefficient. To this end, the motion compensator 1430 may determine the changed reference block as the predicted block of the current block when a value of the average compensation coefficient is not "0", and determine the reference block as the predicted block of the current block when a value of the average compensation coefficient is "0". When the value of the average compensation coefficient is "0", a case of the encoding using the changed reference block, in which the average compensation coefficient is reflected, as the predicted block of the current block and a case of the encoding using the reference block, in which the average compensation coefficient is not reflected, as the predicted block of the current block have the same result, so that it is not necessary to use the average compensation coefficient. Further, the motion compensator 1430 may determine the changed reference block as the predicted block of the current block when the value of the average compensation coefficient belongs to a predetermined range, and determine the reference block as the predicted block of the current block when the value of the average compensation coefficient does not belong to the predetermined range. Here, the predetermined range may be a range smaller than a maximum threshold and larger than a minimum threshold, and the maximum threshold and the minimum threshold may be determined using one or more of a dispersion, a standard deviation, and a coefficient of correlation of the pixels neighboring the current block and the pixels neighboring the reference block. That is, as expressed in Formula 6, the motion compensator 1430 may determine the changed reference block as the predicted block of the current block only when the value of the average compensation coefficient belongs to the predetermined range.

$$\text{Thd}_a < mc_{coeff} < \text{Thd}_b \qquad \text{Formula 6}$$

In Formula 6, $mc_{coeff}$ represents the average compensation coefficient, $\text{Thd}_a$ represents the minimum threshold, and $\text{Thd}_b$ represents the maximum threshold.

As described above, when the motion compensator 1430 determines the changed reference block as the predicted block of the current block based on the value of the average compensation coefficient, the motion compensator 1430 may determine whether the value of the average compensation coefficient is "0" and whether the value of the average compensation coefficient belongs to the predetermined range, respectively, to determine the changed reference block as the predicted block of the current block according to the determination, but may also combine the two conditions, to determine the changed reference block as the predicted block of the current block. That is, only when the value of the average compensation coefficient is not "0" and belongs to the predetermined range, the motion compensator 1430 may determine the changed reference block as the predicted block of the current block, and when the value of the average compensation coefficient is "0", or the value of the average compensation coefficient is not "0" but does not belong to the predetermined range, the motion compensator 1430 may determine the reference block as the predicted block of the current block.

For another example, the motion compensator 1430 may calculate one or more of the dispersion, the standard deviation, and the coefficient of correlation of the pixels neighboring the current block and the pixels neighboring the reference block, and determine the changed reference block as the predicted block of the current block only when a calculated value meets a specific condition, or determine the reference block as the predicted block of the current block when the calculated value does not meet the specific condition.

The motion compensator 1430 may generate the changed reference block by subtracting the average compensation coefficient from each pixel of the reference block. Specifically, each pixel of the changed reference block has a difference value obtained by subtracting the average compensation coefficient from a value of each pixel of the reference block. In this case, since the difference value which is obtained by subtracting the average compensation coefficient from the value of each pixel of the reference block may not belong to a range of a value of pixels, the motion compensator 1430 may limit the value obtained by subtracting the average compensation coefficient from the value of each pixel of the reference block within the range of the value indicating pixels, to generate the changed reference block.

For example, each pixel of the current block, the reference block, the changed reference block, etc. has a value represented by 8 bits, and an available pixel value is one within a range of 0 through 255. When any one pixel among the respective pixels of the reference block has a value of "1" and the average compensation coefficient is calculated as "3", a corresponding pixel in the changed reference block has a value of "−2", so that it does not belong to the range of the value indicating pixels. Accordingly, in this case, the pixel value is limited to have one value within the range of 0 through 255 and the pixel value of the corresponding pixel of the changed reference block is changed such that the pixel value of the corresponding pixel has a value of "0" as the minimum value.

When the residual block is calculated through determination of the changed reference block generated as described above as the predicted block of the current block, the residual block may be calculated by Formula 7.

$$\text{residual}_{ij} = \text{original}_{ij} - \text{clip}(\text{reference}_{ij} - mc_{coeff}) \qquad \text{Formula 7}$$

In Formula 7, $\text{original}_{ij}$ represents each pixel of the current block, $\text{reference}_{ij}$ represents each pixel of the reference block, and $\text{residual}_{ij}$ represents each pixel of the residual block. Here, $\text{clip}(\text{reference}_{ij} - mc_{coeff})$ represents each pixel of the changed reference block, wherein a function, clip( ) limits the minimum value and the maximum value such that $\text{reference}_{ij} - mc_{coeff}$ that is each pixel of the changed reference block has a value within the range of the value indicating pixels (e.g. a value within the range from 0 to 255 when the pixel value is represented by 8 bits).

The motion compensator 1430 may refine a current motion vector by additionally estimating the motion of the current block through the application of the average compensation coefficient. Specifically, the motion compensator 1430 applies the average compensation coefficient to a predetermined range (e.g. ±α pixel) around the pixels directed by the current motion vector determined in the motion estimator 1420 and performs the motion estimation, so that it is possible to further increase the encoding efficiency through the performance of a more accurate prediction of the block (or the macroblock) of a region in which a local illumination or a viewpoint is changed.

For example, in a case where the current motion vector is set as (2,4) and a for determining the predetermined range is set as "1", the motion compensator 1430 may perform the motion compensation on positions of (1, 3), (1, 4), (1, 5), (2, 3), (2, 4), (2, 5), (3, 3), (3, 4), and (3, 5) by using the average compensation coefficient and calculate an optimal motion vector by comparing the encoding cost (e.g. a rate-distortion cost, a Sum of Absolute Difference (SAD), a Sum of Absolute Transformed Difference (SATD), or a Sum of Squared Difference (SSD)) of each position, so that the calculated optimal motion vector is finally determined as the current motion vector. Here, a may be appropriately set according to an implementation method or condition, and the encoding efficient may be increased as a increases.

Further, the motion compensator 1430 may determine whether to determine the changed reference block as the predicted block of the current block based on the unit of groups including a series of blocks, e.g. the unit of macroblocks, slices, or pictures, not the unit of blocks. To this end, in a case where the changed reference block is determined as the predicted block of the current block based on the unit of pictures, the motion compensator 1430 may adaptively encode each picture by calculating the encoding cost required for a case in which a current picture to be encoded is encoded using the average compensation coefficient and the encoding cost required for a case in which a current picture to be encoded is encoded without using the average compensation coefficient and encoding the current picture according to the encoding method requiring the smaller encoding cost. In this case, average compensation coefficient usage information for identifying whether each picture is encoded with the application of the average compensation coefficient is additionally inserted in the encoded data.

Figure 17:
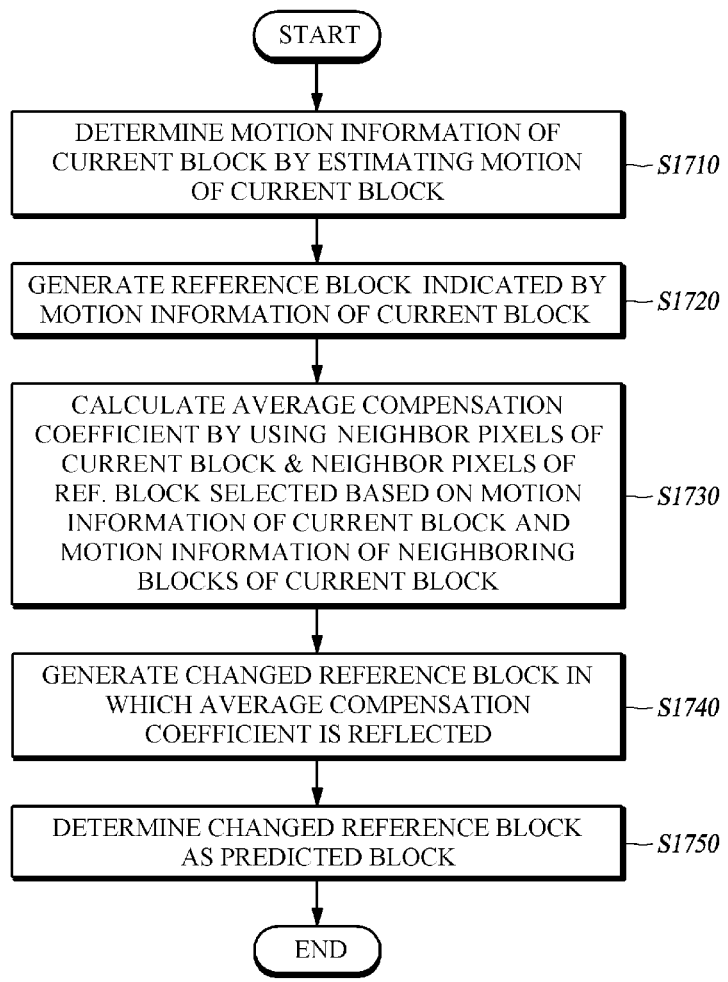
FIG. 17 is a flowchart illustrating an example of an inter prediction method for a predictive encoding according to the second embodiment of the present disclosure.

FIG. 17 is a flowchart illustrating an example of an inter prediction method for a predictive encoding according to the second embodiment of the present disclosure.

According to the inter prediction method for the predictive encoding according to the second embodiment of the present disclosure, the predictor 1310 of the video encoding apparatus 1300 determines motion information of a current block by estimating motion of the current block (S1710), generates a reference block directed by the motion information of the current block (S1720), calculates an average compensation coefficient by using pixels neighboring the current block and pixels neighboring the reference block selected based on the motion information of the current block and motion information of neighboring blocks of the current block (S1730), generates a changed reference block by reflecting the average compensation coefficient in the reference block (S1740), and determines the changed reference block as a predicted block of the current block (S1750).

Here, the current block may be a macroblock having various sizes, and a subblock divided from the macroblock in the transform units. The neighboring blocks of the current block may be blocks, which have been reconstructed through previous encoding and decoding, among blocks adjacent to the current block. The average compensation coefficient may be a difference between an average of the pixels neighboring the current block and an average of the pixels neighboring the reference block.

In step S1730, when neighboring reference blocks directed by motion information of the neighboring blocks of the current block are neighboring blocks of the reference block in the reference picture including the reference block, the predictor 1310 may select adjacent pixels located within the neighboring blocks of the current block and neighboring the current block as the pixels neighboring the current block, and may select adjacent pixels located within the neighboring reference blocks indicated by the motion information of the neighboring blocks of the current block and neighboring the reference block as the pixels neighboring the reference block.

For example, when a reference picture index identified by the motion information of the current block is the same as a reference picture index identified by the motion information of the neighboring blocks of the current block and a difference between the motion vector identified by the motion information of the current block and a motion vector identified by the motion information of the neighboring block of the current block is equal to or smaller than a reference threshold, the predictor 1310 may select adjacent pixels located within the neighboring blocks of the current block and neighboring the current block as the pixels neighboring the current block, and may select adjacent pixels located within the neighboring reference blocks indicated by the motion vectors of the neighboring blocks of the current block and neighboring the reference block as the pixels neighboring the reference block. To this end, when a distance between the motion vector of the current block and the motion vector of the neighboring block of the current block is equal to or smaller than a distance threshold, the predictor 1310 may determine that the difference between the motion vector of the current block and the motion vector of the neighboring block of the current block is equal to or smaller than the reference threshold.

In step S1750, the predictor 1310 may generate the changed reference block by subtracting the average compensation coefficient from each pixel of the reference block, and limit the value obtained by subtracting the average compensation coefficient from each pixel of the reference block within the range of the value indicating pixels, to generate the changed reference block.

Further, in step S1750, the predictor 1310 may calculate an encoding cost for the reference block and an encoding cost for the changed reference block, and determine the changed reference block as the predicted block of the current block when the encoding cost for the reference block is larger than the encoding cost for the changed reference block, and determine the reference block as the predicted block of the current block when the encoding cost for the reference block is equal to or smaller than the encoding cost for the changed reference block.

Further, in step S1750, the predictor 1310 may determine the changed reference block as the predicted block of the current block when a value of the average compensation coefficient is not "0", and determine the reference block as the predicted block of the current block when a value of the average compensation coefficient is "0".

Further, in step S1750, the predictor 1310 may determine the changed reference block as the predicted block of the current block when the value of the average compensation coefficient belongs to a predetermined range, and determine the reference block as the predicted block of the current block when the value of the average compensation coefficient does not belong to the predetermined range. Here, the predetermined range may be a range smaller than a maximum threshold and larger than a minimum threshold, and the maximum threshold and the minimum threshold may be determined using one or more of a dispersion, a standard deviation, and a coefficient of correlation of the pixels neighboring the current block and the pixels neighboring the reference block.

Further, in step S1750, the predictor 1310 may refine a motion vector of the motion information of the current block by additionally estimating the motion of the current block through the application of the average compensation coefficient.

Further, it is not essentially necessary to perform the respective steps described with reference to FIG. 17, and a part of the steps may be selectively omitted or a step may be additionally added. Further, an order of the respective steps is not limited to the order of FIG. 17, and a part or an entirety of the steps may be changed or even performed in parallel.

Figure 18:
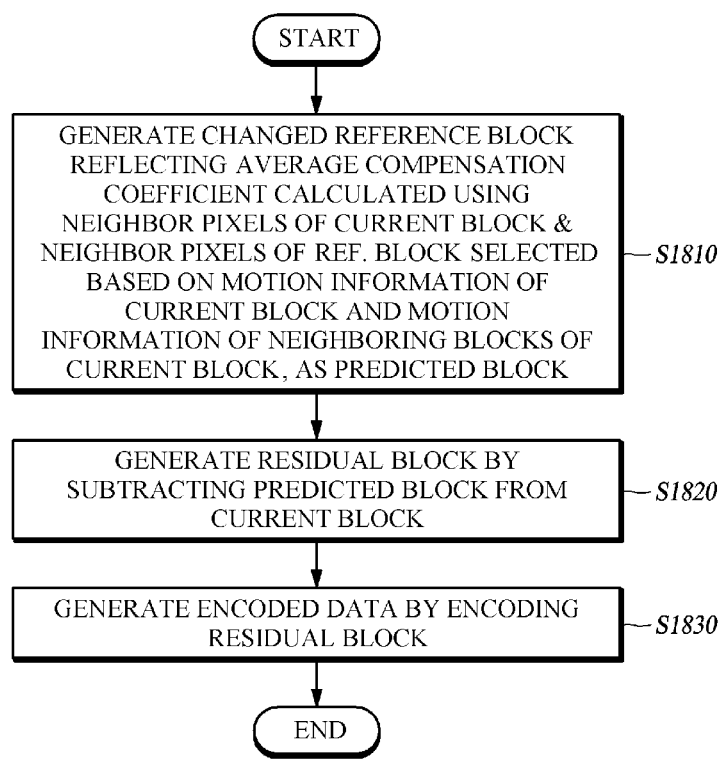
FIG. 18 is a flowchart illustrating a video encoding method according to the second embodiment of the present disclosure.

FIG. 18 is a flowchart illustrating a video encoding method according to the second embodiment of the present disclosure.

The video encoding apparatus 1300 generates a changed reference block generated by reflecting an average compensation coefficient calculated using pixels neighboring the current block and pixels neighboring the reference block in a reference block directed by a current motion vector selected based on motion information of the current block and motion information of neighboring blocks of the current block as a predicted block of the current block (S1810), generates a residual block by subtracting the predicted block from the current block (S1820), and generates encoded data by encoding the residual block (S1830).

Further, the video encoding apparatus 1300 may insert average compensation coefficient usage information indicating the use of the average compensation coefficient in the encoded data.

Further, in step S1810, when neighboring reference blocks directed by motion information of the neighboring blocks of the current block are the neighboring blocks of the reference block in the reference picture including the reference block, the video encoding apparatus 1300 may select adjacent pixels located within the neighboring blocks of the current block and neighboring the current block as the pixels neighboring the current block, and may select adjacent pixels located within the neighboring reference blocks indicated by the motion information of the neighboring blocks of the current block and neighboring the reference block as the pixels neighboring the reference block.

For example, when a reference picture index identified by the motion information of the current block is the same as a reference picture index identified by the motion information of the neighboring block of the current block and a difference between the motion vector identified by the motion information of the current block and a motion vector identified by the motion information of the neighboring block of the current block is equal to or smaller than a reference threshold, the video encoding apparatus 1300 may select adjacent pixels located within the neighboring blocks of the current block and neighboring the current block as the pixels neighboring the current block, and may select adjacent pixels located within the neighboring reference blocks indicated by the motion vectors of the neighboring blocks of the current block and neighboring the reference block as the pixels neighboring the reference block.

Figure 19:
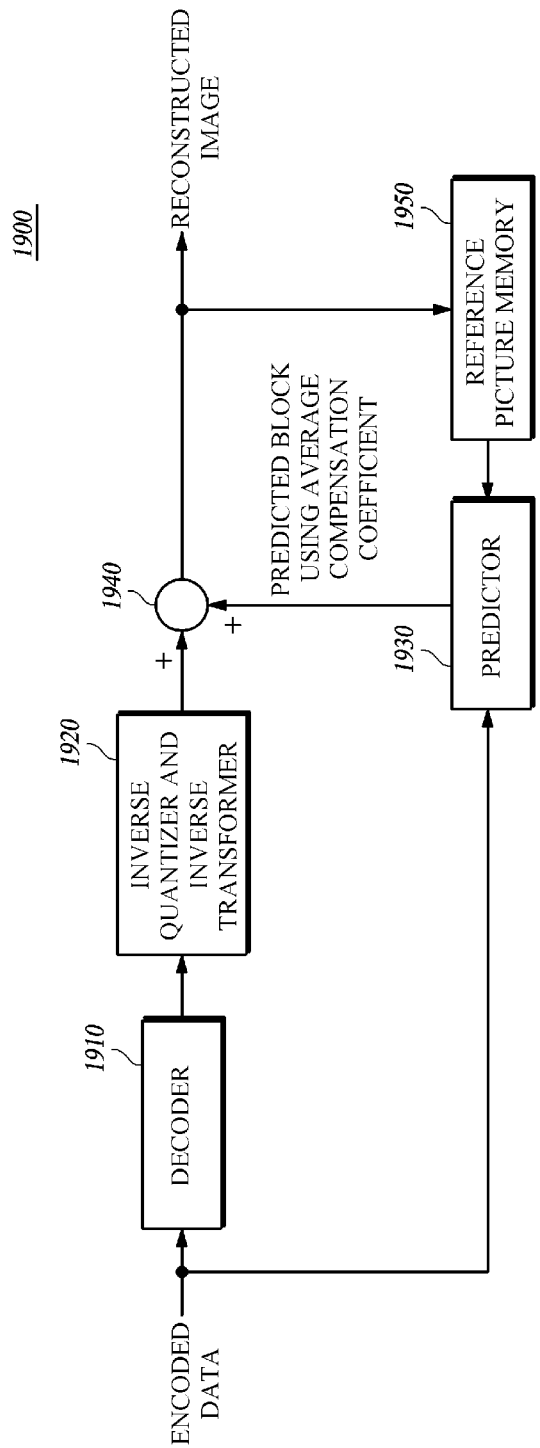
FIG. 19 is a block diagram schematically illustrating a video decoding apparatus according to the second embodiment of the present disclosure.

FIG. 19 is a block diagram schematically illustrating a video decoding apparatus according to the second embodiment of the present disclosure.

The video decoding apparatus 1900 according to the second embodiment of the present disclosure includes a decoder 1910, an inverse quantizer and inverse transformer 1920, a predictor 1930, an adder 1940, and a reference picture memory 1950.

The decoder 1910 reconstructs the residual block having the motion information of the current block and the quantized transform coefficient by decoding the encoded data. Specifically, the decoder 1910 extracts a quantized transform coefficient string by decoding the encoded data, and inversely scans the quantized transform coefficient string with various inverse-scanning methods including an inverse zigzag scanning, to reconstruct the residual block having the quantized transform coefficient. In this case, the decoder 1910 may decode the encoded data by extracting an encoded residual block from a first field included in the encoded data, and decode the encoded data by extracting information necessary for the prediction from a second field included in the encoded data or decode extracted information, and transfer the extracted information or the extracted and decoded information necessary for the prediction to the predictor 1930, so that the predictor 1930 may predict the current block in the same method performed in the predictor 1310 of the video encoding apparatus 1300. Further, when the average compensation coefficient usage information is included in the second field of the encoded data, the decoder 1910 may extract the average compensation coefficient usage information and transfer the extracted average compensation coefficient usage information to the predictor 1930.

The inverse quantizer and inverse transformer 1920 generates the residual block having the transform coefficient by inversely quantizing the residual block having the reconstructed quantized transform coefficient decoded by the decoder 1910, and reconstructs the residual block having the residual signal by inversely transforming the residual block having the transform coefficient.

FIG. 19 illustrates the independent implementation of the decoder 1910 and the inverse quantizer and inverse transformer 1920, but the respective functions of the independent implementation of the decoder 1910 and the inverse quantizer and inverse transformer 1920 may be combined and implemented in one decoder. As such, when the respective functions of the independent implementation of the decoder 1910 and the inverse quantizer and inverse transformer 1920 may be combined and implemented, the decoder 1910 may reconstruct the current motion vector and the residual block by decoding the encoded data, and extract the average compensation coefficient usage information from the encoded data if necessary.

The predictor 1930 generates a changed reference block generated by reflecting the average compensation coefficient calculated by using pixels neighboring the current block and pixels neighboring the reference block which are selected based on the motion information of the reconstructed current block and the motion information of the neighboring blocks of the current block in a reference block directed by the motion information of the reconstructed current block as a predicted block of the current block. Specifically, the predictor 1930 generates the predicted block of the current block by using information, such as the motion information of the current block reconstructed in the decoder 1910 and the average compensation coefficient usage information, necessary for a prediction. In this event, when the predictor 1930 receives the average compensation coefficient usage information from the decoder 1910, the predictor 1930 may determine whether to compensate for the motion of the current block through an application of the average compensation coefficient based on the average compensation coefficient usage information transferred in the generation of the predicted block, to generate the predicted block. The predictor 1930 will be described in following descriptions with reference to FIG. 21 in detail.

The adder 1940 reconstructs the current block by adding the reconstructed residual block and the predicted block. Specifically, the adder 1940 adds the residual block reconstructed by the inverse quantizer and inverse transformer 1920 and the predicted block generated by the predictor 1930 to reconstruct the current block. The current block reconstructed by the adder 1940 may be transferred to the reference frame memory 1950, and accumulated in the unit of pictures and stored as the reference picture in the reference frame memory 1950, and the reference picture may be used for a prediction of another block or another frame by the predictor 1930.

Although it is not illustrated in FIG. 19, the video decoding apparatus 1900 according to the second embodiment of the present disclosure may further include an intra predictor for the intra prediction, a deblocking filter for the deblocking-filtering of the reconstructed current block, etc. Further, the inverse quantizer and inverse transformer 1920 may additionally perform the inverse transform and inverse quantization on a specific picture (e.g. an intra picture).

Figure 20:
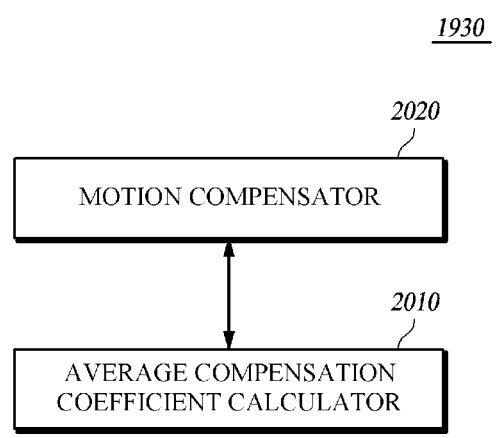
FIG. 20 is a block diagram schematically illustrating an inter prediction apparatus for a predictive decoding according to the second embodiment of the present disclosure.

FIG. 20 is a block diagram schematically illustrating an inter prediction apparatus for a predictive decoding according to the second embodiment of the present disclosure The inter prediction apparatus for a predictive decoding according to the second embodiment of the present disclosure may be implemented as the predictor 1930 in the video decoding apparatus 1900 according to the second embodiment of the present disclosure aforementioned with reference to FIG. 19, and so is called the predictor 1930 for convenience of description hereinafter.

The predictor 1930 may include an average compensation coefficient calculator 2010 and a motion compensator 2020.

The average compensation coefficient calculator 2010 generates a reference block directed by the motion information of a reconstructed current decoded by decoding the encoded data and calculates the average compensation coefficient by using pixels neighboring the current block and pixels neighboring the reference block selected based on the motion information of the reconstructed current block and motion information of neighboring blocks of the current block. Specifically, when the average compensation coefficient calculator 2010 receives the motion information of the current block reconstructed by the decoder 1910 from the decoder 1910 or the motion compensator 2020, the average compensation coefficient calculator 2010 generates the reference block directed by the motion information of the reconstructed current block, selects the pixels neighboring the current block and the pixels neighboring the reference block by determining if blocks directed by the motion information of the neighboring blocks of the current block still serve as neighboring blocks of the reference block in the reference picture including the reference block based on the motion information of the current block and the motion information of the neighboring blocks of the current block, and calculates the average compensation coefficient by using the selected pixels neighboring the current block and pixels neighboring the reference block. A process of calculating the average compensation coefficient by using the pixels neighboring the current block and the pixels neighboring the reference block by the average compensation coefficient calculator 2010 is the same as or similar to a process of calculating the average compensation coefficient by the average compensation coefficient calculator 1420 aforementioned through FIGS. 14 to 16, so its detailed description will be omitted.

The motion compensator 2020 generates a changed reference block by reflecting the average compensation coefficient in the reference block and determines the changed reference block as a predicted block of the current block. Here, the motion compensator 2020 may determine the changed reference block as the predicted block of the current block based on the average compensation coefficient usage information or the average compensation coefficient. For example, when the motion compensator 2020 receives the average compensation coefficient usage information from the decoder 1910, the motion compensator 2020 may determine the changed reference block as the predicted block of the current block when the average compensation coefficient usage information indicates the use of the average compensation coefficient, and determine the reference block as the predicted block of the current block when the average compensation coefficient usage information indicates the non-use of the average compensation coefficient. That is, when the average compensation coefficient usage information is included in the encoded data, the video encoding apparatus 1300 has determined whether to compensate for the motion of the current block through the application of the average compensation coefficient based on the encoding cost for the reference block and the encoding cost for the changed reference block. Thus, the motion compensator 2020 may determine whether the average compensation coefficient usage information indicates the use of the average compensation coefficient (e.g. flag "1") or the non-use of the average compensation coefficient (e.g. flag "0") and determine whether to determine the changed reference block or the reference block as the predicted block of the current block.

For another example, the motion compensator 2020 may determine the changed reference block as the predicted block of the current block when a value of the average compensation coefficient is not "0" and determine the reference block as the predicted block of the current block when a value of the average compensation coefficient is "0", or determine the changed reference block as the predicted block of the current block when a value of the average compensation coefficient belongs to the predetermined range and determine the reference block as the predicted block of the current block when a value of the average compensation coefficient does not belong to the predetermined range. That is, when the average compensation coefficient usage information is not included in the encoded data, the video encoding apparatus 1300 has determined whether to compensate for the motion of the current block through the application of the average compensation coefficient based on the value of the average compensation coefficient, so the motion compensator 2020 may determine if the value of the average compensation coefficient meets a predetermined condition (i.e. whether the value of the average compensation coefficient is "0" and/or whether the value of the average compensation coefficient belongs to the predetermined range) according to a method previously appointed with the video encoding apparatus 1300, to determine the changed reference block or the reference block as the predicted block of the current block according to the determination.

Figure 21:
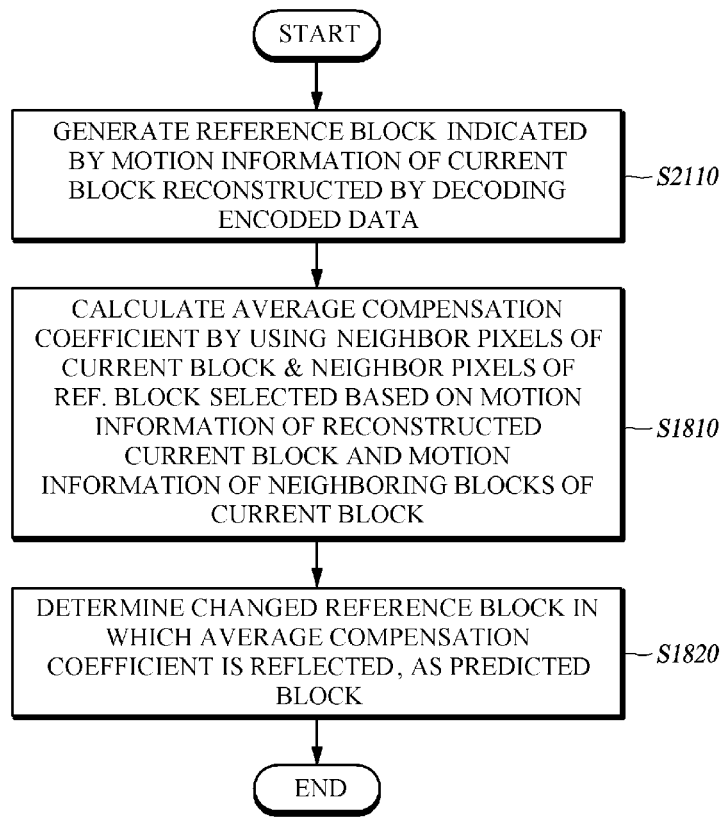
FIG. 21 is a flowchart illustrating an inter prediction method for a predictive decoding according to the second embodiment of the present disclosure.

FIG. 21 is a flowchart illustrating an inter prediction method for a predictive decoding according to the second embodiment of the present disclosure.

According to the inter predictive method for a predictive decoding according to the second embodiment of the present disclosure, the predictor 1930 generates a reference block directed by motion information of a current block reconstructed by decoding the encoded data (S2110), calculates an average compensation coefficient by using pixels neighboring the current block and pixels neighboring the reference block selected based on the motion information of the reconstructed current block and motion information of neighboring blocks of the current block (S2120), generates a changed reference block by reflecting the average compensation coefficient in the reference block and determines the changed reference block as a predicted block of the current block (S2130).

Here, the current block may be a macroblock having various sizes, and a subblock divided from the macroblock in the transform units. The neighboring blocks of the current block may be reconstructed blocks which have been reconstructed through previous decoding among blocks adjacent to the current block. The average compensation coefficient may be a difference between an average of the pixels neighboring the current block and an average of the pixels neighboring the reference block.

In step S2120, when neighboring reference blocks directed by motion information of the neighboring blocks of the current block are neighboring blocks of the reference block in the reference picture including the reference block, the predictor 1930 may select adjacent pixels located within the neighboring blocks of the current block and neighboring the current block as the pixels neighboring the current block, and may select adjacent pixels located within the neighboring reference blocks indicated by the motion information of the neighboring blocks of the current block and neighboring the reference block as the pixels neighboring the reference block.

For example, when a reference picture index identified by the motion information of the reconstructed current block is the same as a reference picture index of the neighboring blocks of the current block and a difference between the motion vector of the current block identified by the motion information of the current block and a motion vector of the neighboring block of the current block is equal to or smaller than a reference threshold, the predictor 1930 may select adjacent pixels located within the neighboring blocks of the current block and neighboring the current block as the pixels neighboring the current block, and may select adjacent pixels located within the neighboring reference blocks indicated by the motion vectors of the neighboring blocks of the current block and neighboring the reference block as the pixels neighboring the reference block. To this end, when a distance between the motion vector of the current block identified by the motion information of the reconstructed current block and the motion vector of the neighboring block of the current block is equal to or smaller than a distance threshold, the predictor 1930 may determine that the difference between the motion vector of the current block and the motion vector of the neighboring block of the current block is equal to or smaller than the reference threshold.

In step S2130, the predictor 1930 may generate the changed reference block by subtracting the average compensation coefficient from the value of each pixel of the reference block, and limit the value obtained by subtracting the average compensation coefficient from the value of each pixel of the reference block within the range of the value indicating pixels if necessary, to generate the changed reference block.

Further, in step S2130, the predictor 1930 may determine the changed reference block as the predicted block of the current block when the average compensation coefficient usage information extracted from the encoded data indicates use of the average compensation coefficient, and determine the reference block as the predicted block of the current block when the average compensation coefficient usage information indicates non-use of the average compensation coefficient.

Further, in step S2130, the predictor 1930 may determine the changed reference block as the predicted block of the current block when the average compensation coefficient is not "0", and determine the reference block as the predicted block of the current block when the average compensation coefficient is "0".

Further, in step S2130, the predictor 1930 may determine the changed reference block as the predicted block of the current block when the average compensation coefficient belongs to a predetermined range, and determine the reference block as the predicted block of the current block when the average compensation coefficient does not belong to the predetermined range.

Further, it is not essentially necessary to perform the respective steps described with reference to FIG. 21, and a part of the steps may be selectively omitted or a step may be additionally added. Further, an order of the respective steps is not limited to the order of FIG. 21, and a part or an entirety of the steps may be changed or even performed in parallel.

Figure 22:
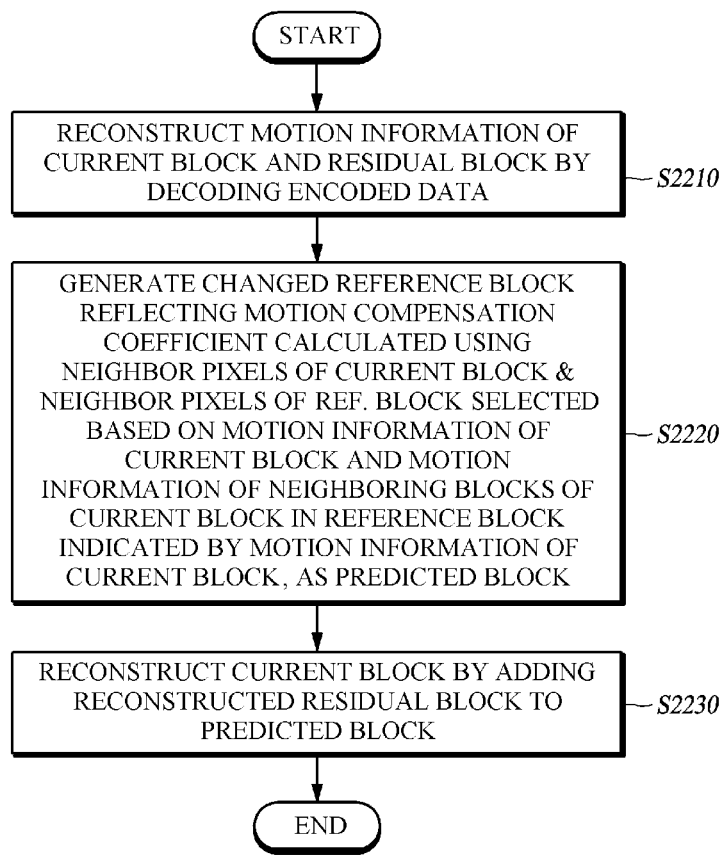
FIG. 22 is a flowchart schematically illustrating a video decoding method according to the second embodiment of the present disclosure.

FIG. 22 is a flowchart schematically illustrating a video decoding method according to the second embodiment of the present disclosure.

The video decoding apparatus 1900 reconstructs motion information of a current block and a residual block by decoding encoded data (S2210), generates a changed reference block generated by reflecting an average compensation coefficient calculated using pixels neighboring the current block and pixels neighboring the reference block selected based on motion information of a reconstructed current block and motion information of neighboring blocks of the current block in a reference block directed by the motion information of the reconstructed current block as a predicted block of the current block (S2220), and reconstructs the current block by adding a reconstructed residual block to the predicted block (S2230).

Further, the video decoding apparatus 1900 may additionally extract average compensation coefficient usage information from the encoded data, and in this event, the video decoding apparatus 1900 may determine the changed reference block as the predicted block of the current block when the average compensation coefficient usage information indicates use of the average compensation coefficient, and the reference block as the predicted block of the current block when the average compensation coefficient usage information indicates non-use of the average compensation coefficient.

In addition, it is a matter of course that, as described with reference to FIGS. 20 and 21, the video decoding apparatus 1900 may selectively determine the reference block or the changed reference block as the predicted block of the current block based on a value of the average compensation coefficient. Further, in step S2220, when a neighboring reference block directed by the motion information of the neighboring block of the current block is a neighboring block of the reference block in a reference picture including the reference block, the video decoding apparatus 1900 may select adjacent pixels located within the neighboring blocks of the current block and neighboring the current block as the pixels neighboring the current block, and may select adjacent pixels located within the neighboring reference blocks indicated by the motion information of the neighboring blocks of the current block and neighboring the reference block as the pixels neighboring the reference block.

For example, when a reference picture index of the current block indentified by the motion information of the reconstructed current block is identical to a reference picture index of the neighboring block of the current block and a difference between a motion vector of the current block indentified by the motion information of the reconstructed current block and a motion vector of the neighboring block of the current block is equal to or smaller than a reference threshold, the video decoding apparatus 1900 may select adjacent pixels located within the neighboring blocks of the current block and neighboring the current block as the pixels neighboring the current block, and may select adjacent pixels located within the neighboring reference blocks indicated by the motion vectors of the neighboring blocks of the current block and neighboring the reference block as the pixels neighboring the reference block.

As described above, the present disclosure according to the second embodiment may more accurately predict a block to be encoded by adaptively calculating the average compensation coefficient according to a characteristic of an image and reflecting the calculated average compensation coefficient in the predicted block, thereby reducing a difference between an actual block and a predicted block and thus improving the compression efficiency.

In the description above, although all of the components of the first and second embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the embodiments of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary embodiments of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above aspects but by the claims and the equivalents thereof.

INDUSTRIAL APPLICABILITY

As described above, the present disclosure is highly useful for application in the fields of a video compression processing of encoding, decoding and transmitting a video, by more accurately predicting a block to be encoded, thereby reducing a difference between an actual block and a predicted block and thus improving the compression efficiency.

The invention claimed is:

1. An inter prediction method for encoding a video image, comprising:
   determining a current motion vector of a current block in a current picture;
   generating a reference block by interpolating pixels at a position indicated by the current motion vector in a reference picture;
   calculating a compensation coefficient by using values of one or more first pixels neighboring the current block in the current picture and values of one or more second pixels neighboring the reference block in the reference picture;
   when a value of the compensation coefficient is not "0", generating a changed reference block by applying the compensation coefficient to the reference block, and setting the changed reference block to be a predicted block of the current block; and
   when the value of the compensation coefficient is "0", setting the reference block to be the predicted block of the current block,
   wherein the one or more first pixels and the one or more second pixels are pixels encoded prior to encoding the current block.

2. The inter prediction method as claimed in claim 1, further comprising: encoding information for indicating that the changed reference block is selected as the predicted block.

3. An inter prediction method for encoding a video image, comprising:
   determining a current motion vector of a current block in a current picture;
   generating a reference block by interpolating pixels at a position indicated by the current motion vector in a reference picture;
   calculating a compensation coefficient by using values of one or more first pixels neighboring the current block in the current picture and values of one or more second pixels neighboring the reference block in the reference picture;
   generating a changed reference block by applying the compensation coefficient to the reference block, and setting the changed reference block to be a predicted block of the current block when a value of the compensation coefficient is within a predetermined range; and
   setting the reference block to be the predicted block of the current block when a value of the compensation coefficient is out of the predetermined range,
   wherein the one or more first pixels and the one or more second pixels are pixels encoded prior to encoding the current block,
   wherein the predetermined range is identified by a maximum threshold and a minimum threshold.

4. The inter prediction method as claimed in claim 1, further comprising:
   re-determining the current motion vector after applying the compensation coefficient to pixels in the reference picture.

5. The inter prediction method as claimed in claim 1, wherein the compensation coefficient is calculated based on a difference between an average of the one or more first pixels and an average of the one or more second pixels.

6. An inter prediction method for encoding a video image, comprising:
  determining a current motion vector of a current block in a current picture;
  generating a reference block by interpolating pixels at a position indicated by the current motion vector in a reference picture;
  calculating a compensation coefficient by using values of one or more first pixels neighboring the current block in the current picture and values of one or more second pixels neighboring the reference block in the reference picture;
  when the value of the compensation coefficient is not "0", generating a changed reference block by applying the compensation coefficient to the reference block, and determining a predicted block of the current block based on the changed reference block; and
  when the value of the compensation coefficient is "0", setting the reference block to be the predicted block of the current block,
  wherein the one or more first pixels and the one or more second pixels are pixels encoded prior to encoding the current block,
  wherein the changed reference block is generated by either subtracting the compensation coefficient from each pixel of the reference block or adding the compensation coefficient to each pixel of the reference block.

7. The inter prediction method as claimed in claim 6, wherein each value of pixels of the changed reference block has a value within a preset range.

8. The inter prediction method as claimed in claim 6, wherein the one or more first pixels and the one or more second pixels are selected based on a comparison between motion information of the current block and motion information of one or more neighboring blocks of the current block.

9. An inter prediction method for decoding a video image, comprising:
  reconstructing a current motion vector of a current block in a current picture from a bitstream;
  generating a reference block by interpolating pixels at a position indicated by the current motion vector in a reference picture;
  calculating a compensation coefficient by using values of one or more first pixels neighboring the current block in the current picture and values of one or more second pixels neighboring the reference block in the reference picture;
  when a value of the compensation coefficient is not "0", generating a changed reference block by applying the compensation coefficient to the reference block; and setting the changed reference block to be a predicted block of the current block; and
  when the value of the compensation coefficient is "0", setting the reference block to be the predicted block of the current block,
  wherein the one or more first pixels and the one or more second pixels are pixels decoded prior to decoding the current block.

10. The inter prediction method as claimed in claim 9, further comprising:
  extracting compensation coefficient usage information from the bitstream,
  wherein the predicted block of the current block is determined based on the compensation coefficient when the compensation coefficient usage information indicates use of the compensation coefficient.

11. An inter prediction method for decoding a video image, comprising:
  reconstructing a current motion vector of a current block in a current picture from a bitstream;
  generating a reference block by interpolating pixels at a position indicated by the current motion vector in a reference picture;
  calculating a compensation coefficient by using values of one or more first pixels neighboring the current block in the current picture and values of one or more second pixels neighboring the reference block in the reference picture;
  generating a changed reference block by applying the compensation coefficient to the reference block, and
  setting the changed reference block to be a predicted block of the current block, when a value of the compensation coefficient is within a predetermined range; and
  setting the reference block to be the predicted block of the current block when the value of the compensation coefficient is out of the predetermined range,
  wherein the one or more first pixels and the one or more second pixels are pixels decoded prior to decoding the current block,
  wherein the predetermined range is identified by a maximum threshold and a minimum threshold.

12. The inter prediction method as claimed in claim 9, wherein the one or more first pixels and the one or more second pixels are selected based on a comparison between motion information of the current block and motion information of one or more neighboring blocks adjacent to the current block.

13. The inter prediction method as claimed in claim 9, wherein the current block is a subblock of a macroblock.

14. The inter prediction method as claimed in claim 9, wherein when one or more neighboring reference blocks indicated by the motion information of the one or more neighboring blocks are neighboring the reference block in the reference picture,
  one or more pixels located within the one or more neighboring blocks are selected as the one or more first pixels, and
  one or more pixels located within the one or more neighboring reference blocks are selected as the one or more first pixels.

15. The inter prediction method as claimed in claim 12, wherein when one or more differences between the current motion vector and one or more motion vectors of the one or more neighboring blocks are smaller than a reference threshold,
  one or more pixels located within the one or more neighboring blocks are selected as the one or more first pixels, and
  one or more pixels located within one or more neighboring reference blocks are selected as the one or more second pixels, the one or more neighboring reference blocks being indicated by motion information of the one or more neighboring blocks.

16. The inter prediction method as claimed in claim 15, wherein when one or more distances between the current motion vector and the one or more motion vectors of the one or more neighboring blocks smaller than a distance threshold, the one or more differences are smaller than the reference threshold.

17. The inter prediction method as claimed in claim 9, wherein the compensation coefficient is calculated based on a difference between an average of the one or more first pixels and an average of the one or more second pixels.

18. An inter prediction method for decoding a video image, comprising:
  reconstructing a current motion vector of a current block in a current picture from a bitstream;
  generating a reference block by interpolating pixels at a position indicated by the current motion vector in a reference picture;
  calculating a compensation coefficient by using values of one or more first pixels neighboring the current block in the current picture and values of one or more second pixels neighboring the reference block in the reference picture;
  generating a changed reference block by applying the compensation coefficient to the reference block, and
  determining a predicted block of the current block based on the changed reference block, when a value of the compensation coefficient is within a predetermined range; and
  setting the reference block to be the predicted block of the current block when the value of the compensation coefficient is out of the predetermined range,
  wherein the one or more first pixels and the one or more second pixels are pixels decoded prior to decoding the current block,
  wherein the changed reference block is generated by either subtracting the compensation coefficient from each pixel of the reference block or adding the compensation coefficient to each pixel of the reference block,
  wherein the predetermined range is identified by a maximum threshold and a minimum threshold.

19. The inter prediction method as claimed in claim 9, wherein each value of pixels of the changed reference block has a value within a preset range.

* * * * *